United States Patent
Hodsdon et al.

(10) Patent No.: US 7,306,690 B2
(45) Date of Patent: Dec. 11, 2007

(54) METHOD FOR APPLYING LABELS

(75) Inventors: Jerry G. Hodsdon, Forestdale, MA (US); Daisy S. Taw, Temple City, CA (US); Chase Taylor Thompson, East Palo Alto, CA (US); Donald E. Banks, Huntington Beach, CA (US); Sung Do, Upland, CA (US)

(73) Assignee: Avery Dennison Corporation, Pasadena, CA (US)

( * ) Notice: Subject to any disclaimer, the term of this patent is extended or adjusted under 35 U.S.C. 154(b) by 0 days.

(21) Appl. No.: 11/499,602

(22) Filed: Aug. 3, 2006

(65) Prior Publication Data
US 2006/0269716 A1 Nov. 30, 2006

Related U.S. Application Data

(62) Division of application No. 10/296,480, filed as application No. PCT/US01/16648 on May 22, 2001.

(60) Provisional application No. 60/283,062, filed on Apr. 11, 2001, provisional application No. 60/248,147, filed on Nov. 13, 2000.

(51) Int. Cl.
- *B29C 65/00* (2006.01)
- *B32B 37/00* (2006.01)
- *B32B 38/18* (2006.01)
- *B23K 37/04* (2006.01)

(52) U.S. Cl. .................. 156/247; 156/250; 156/556; 156/580; 156/DIG. 2; 156/DIG. 37

(58) Field of Classification Search .......... 156/247, 156/249, 556, 580, DIG. 2, DIG. 37, 250; 40/340; 283/81
See application file for complete search history.

(56) References Cited

U.S. PATENT DOCUMENTS 3,316,709 A 5/1967 Edwards
(Continued)

FOREIGN PATENT DOCUMENTS

FR 2763913 12/1998
(Continued)

*Primary Examiner*—Philip Tucker
*Assistant Examiner*—Sing P. Chan
(74) *Attorney, Agent, or Firm*—Jeffer, Mangels, Butler & Marmaro LLP

(57) ABSTRACT

A facestock releasably adhered to a liner sheet is die cut to form one or two compact disc labels, and two diametrically opposed tabs on each compact disc label and located so that one edge of the tab is in contact with one of the compact disc labels and is perforated. The liner side of the tab also has a die cut patterned so that it generally follows the outline of the tab, but which forms a shape which is inside of and slightly smaller than the face cut tab pattern. After the label sheet has passed through a printer or copier and the desired indicia has been printed on the labels, at least one of the tabs is pushed through from the reverse side of the sheet, or pulled through via a sheet opening partially separating the tab from the rest of the sheet. The tab, which is mostly free of exposed adhesive in that it is still laminated to the die cut section of release liner, is then grasped from the face side, and lifted upward, pulling the compact disc label away from the label sheet. If there is a second tab on the label, this is also removed as the label is removed, and can be grasped by the user's other hand in order to control the position of the label. The user is now able to position the label either directly onto the compact disc or into an alignment apparatus, without any significant contact to an adhesive coated surface.

89 Claims, 34 Drawing Sheets

U.S. PATENT DOCUMENTS

| | | |
|---|---|---|
| 3,687,769 A | 8/1972 | Dague |
| 4,317,852 A * | 3/1982 | Ogden .................... 428/40.1 |
| 4,385,460 A | 5/1983 | Hanna |
| 4,478,866 A | 10/1984 | Ohta et al. |
| 4,507,883 A | 4/1985 | Tarrant |
| 4,584,219 A | 4/1986 | Baartmans |
| 4,687,536 A | 8/1987 | Hiramatsu et al. |
| 4,879,710 A | 11/1989 | Iijima |
| 4,903,255 A | 2/1990 | Sugaya et al. |
| D311,030 S | 10/1990 | Lanigan |
| 5,421,950 A | 6/1995 | Parrish |
| 5,484,168 A | 1/1996 | Chigot |
| 5,497,701 A | 3/1996 | Uland |
| 5,543,001 A | 8/1996 | Casillo et al. |
| 5,783,033 A | 7/1998 | Grossman |
| 5,787,069 A | 7/1998 | Lowe et al. |
| 5,789,050 A | 8/1998 | Kang |
| 5,799,982 A | 9/1998 | McClure et al. |
| 5,902,446 A | 5/1999 | Casillo et al. |
| 5,924,561 A | 7/1999 | Baumgartner et al. |
| 5,925,200 A | 7/1999 | Grossman |
| 5,958,536 A | 9/1999 | Gelsinger et al. |
| D415,798 S | 10/1999 | Davies |
| 6,047,488 A * | 4/2000 | Tuszkiewicz ................ 40/306 |
| 6,054,009 A | 4/2000 | Cote et al. |
| D427,243 S | 6/2000 | Luby et al. |
| 6,168,841 B1 | 1/2001 | Chen |
| 6,196,290 B1 | 3/2001 | Tracy et al. |
| 6,279,960 B1 | 8/2001 | Claussnitzer |
| 6,302,176 B1 | 10/2001 | Chen |
| 6,321,814 B1 | 11/2001 | Tracy et al. |
| 6,347,654 B1 | 2/2002 | Koch |
| 6,403,191 B1 | 6/2002 | Casagrande |
| 6,428,640 B1 * | 8/2002 | Stevens et al. ................ 156/64 |
| 6,479,118 B1 | 11/2002 | Atkinson |
| 6,481,572 B2 | 11/2002 | Wien |
| 6,484,777 B1 | 11/2002 | Quinteros et al. |
| 6,508,914 B1 | 1/2003 | Schwaller et al. |
| 6,514,588 B2 | 2/2003 | Rosenbaum et al. |
| D475,740 S | 6/2003 | Kuenz |
| D476,031 S | 6/2003 | Hodsdon et al. |
| 6,576,315 B2 | 6/2003 | Treleaven et al. |
| 6,689,238 B2 | 2/2004 | Barnet |
| 6,716,492 B1 | 4/2004 | Moriya et al. |
| 6,803,084 B1 | 10/2004 | Do et al. |
| 2001/0025689 A1 | 10/2001 | Barnet |
| 2002/0005255 A1 | 1/2002 | Leonardi |
| 2002/0139489 A1 | 10/2002 | Grogg |
| 2004/0108071 A1 | 6/2004 | Wien |
| 2006/0037507 A1 | 2/2006 | Trigg et al. |

FOREIGN PATENT DOCUMENTS

| | | |
|---|---|---|
| GB | 2351273 | 12/2000 |
| JP | 2001-101827 | 4/2001 |
| WO | WO 9826986 | 6/1998 |
| WO | WO 9829313 | 7/1998 |

* cited by examiner

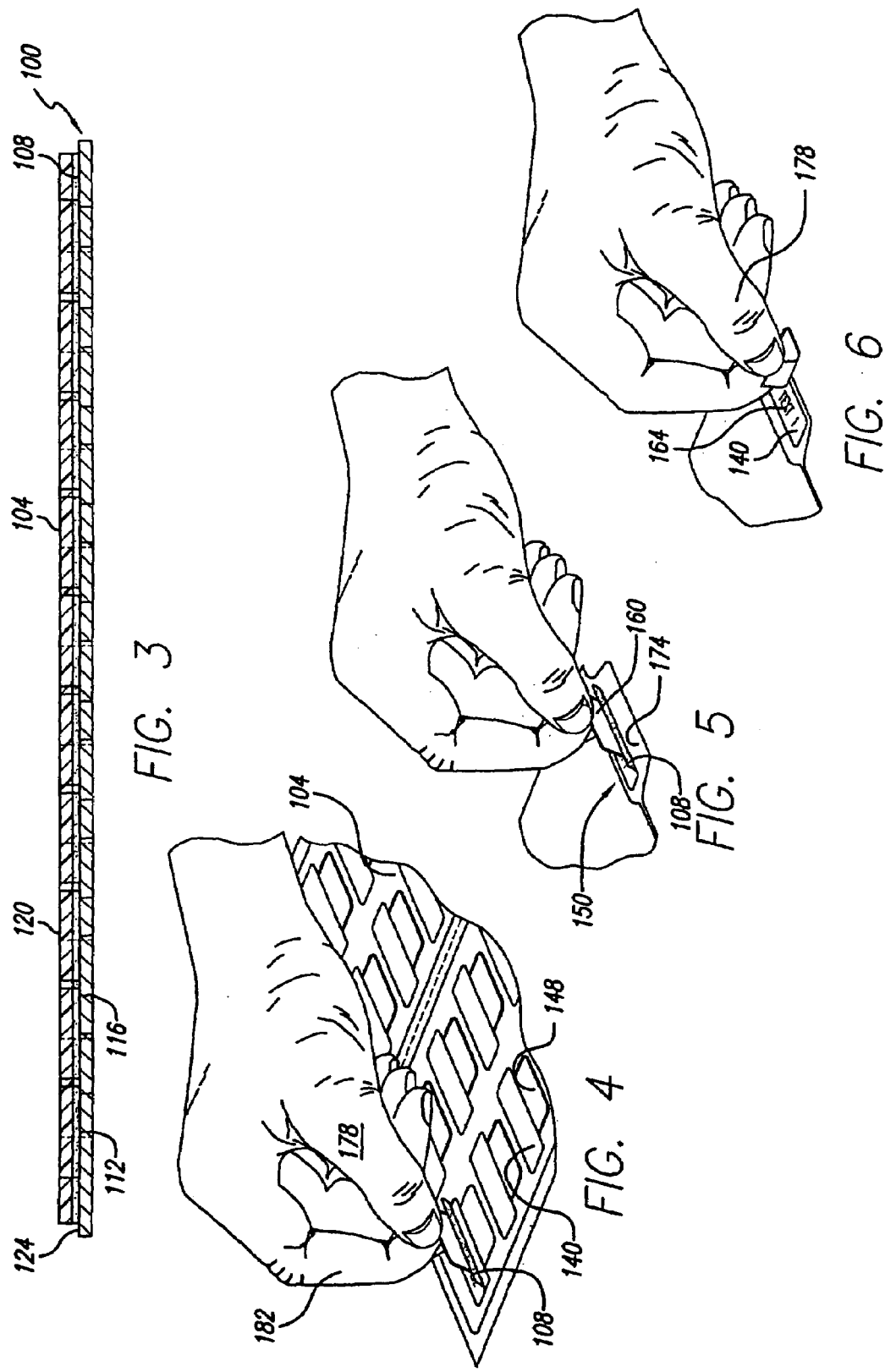

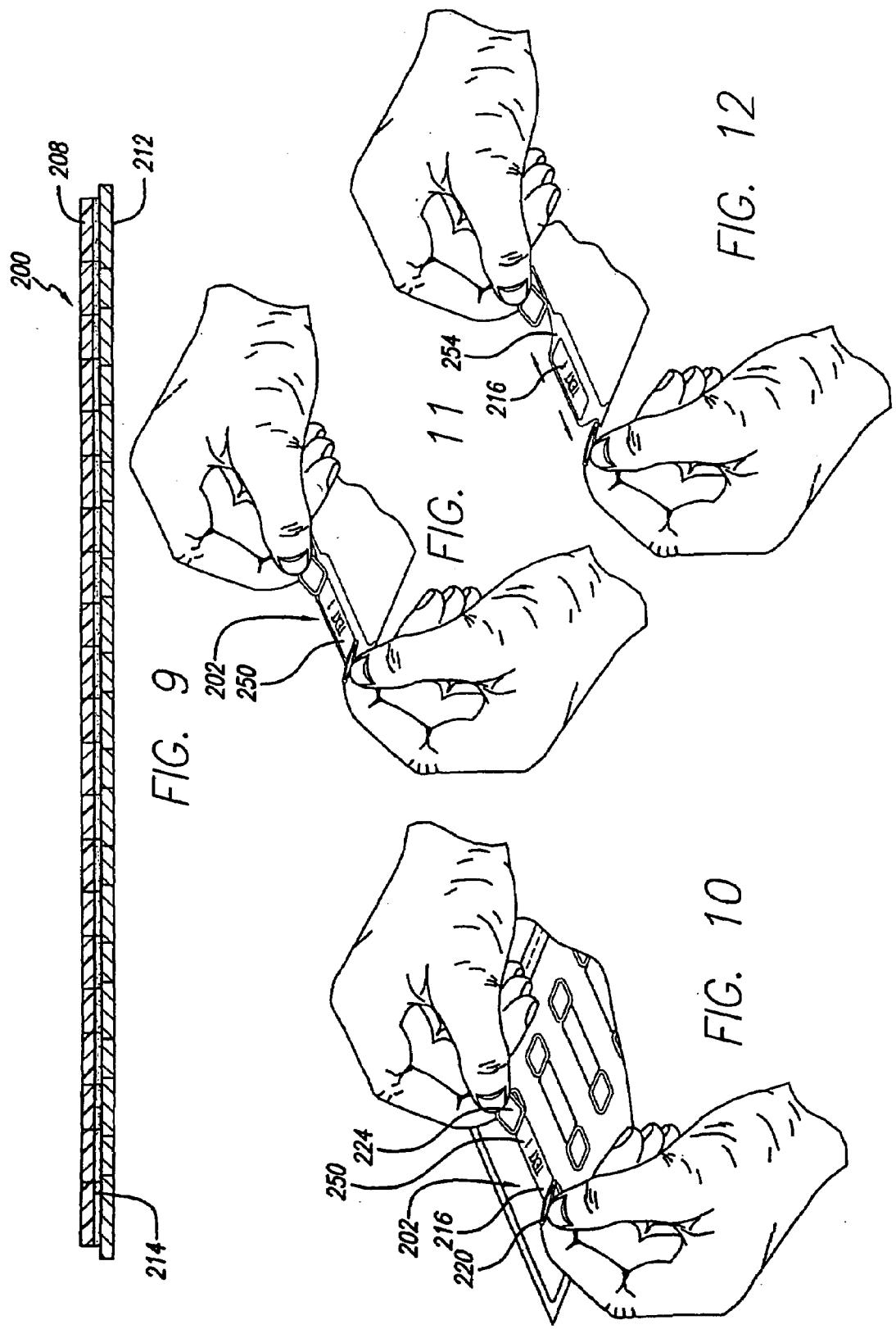

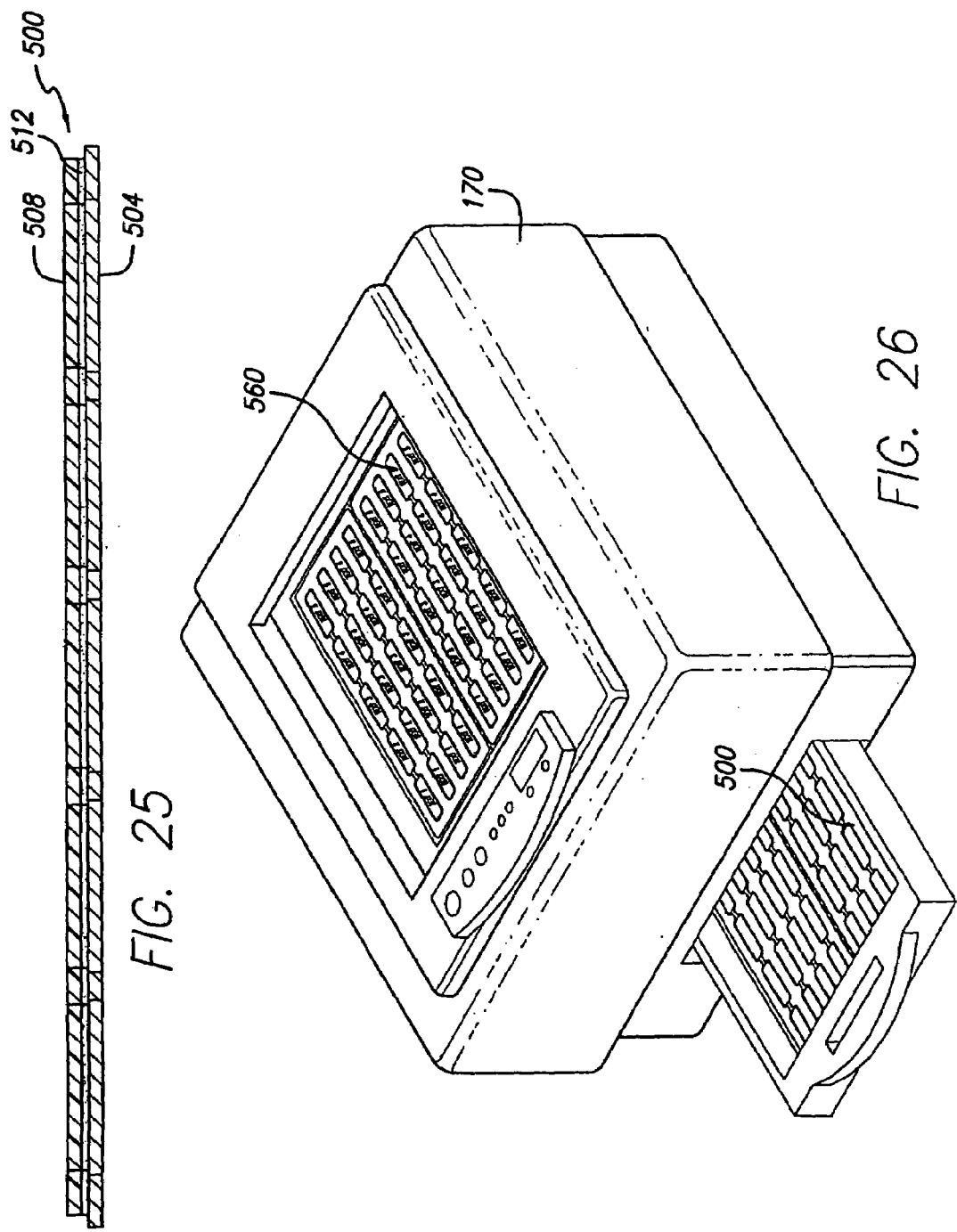

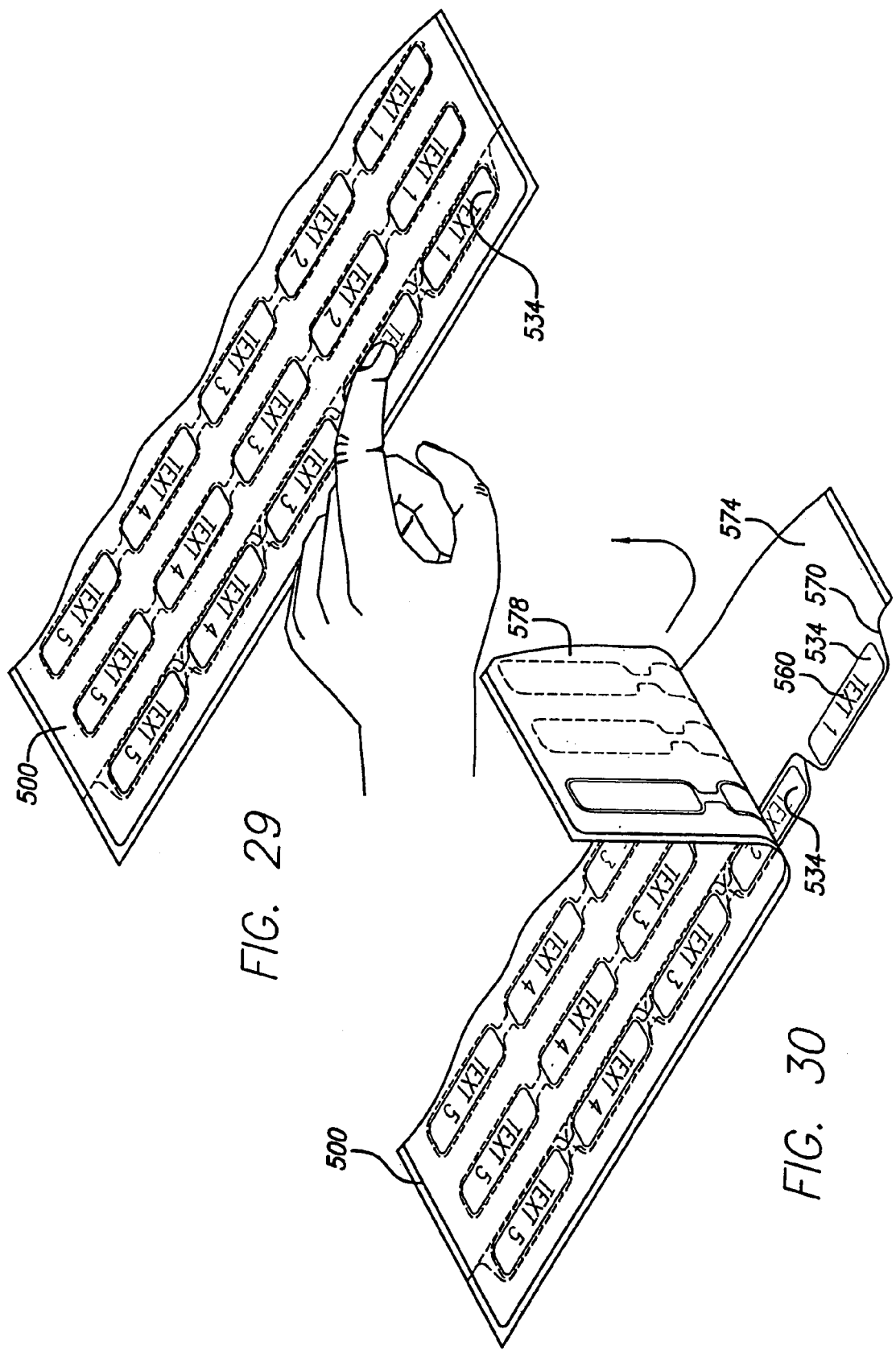

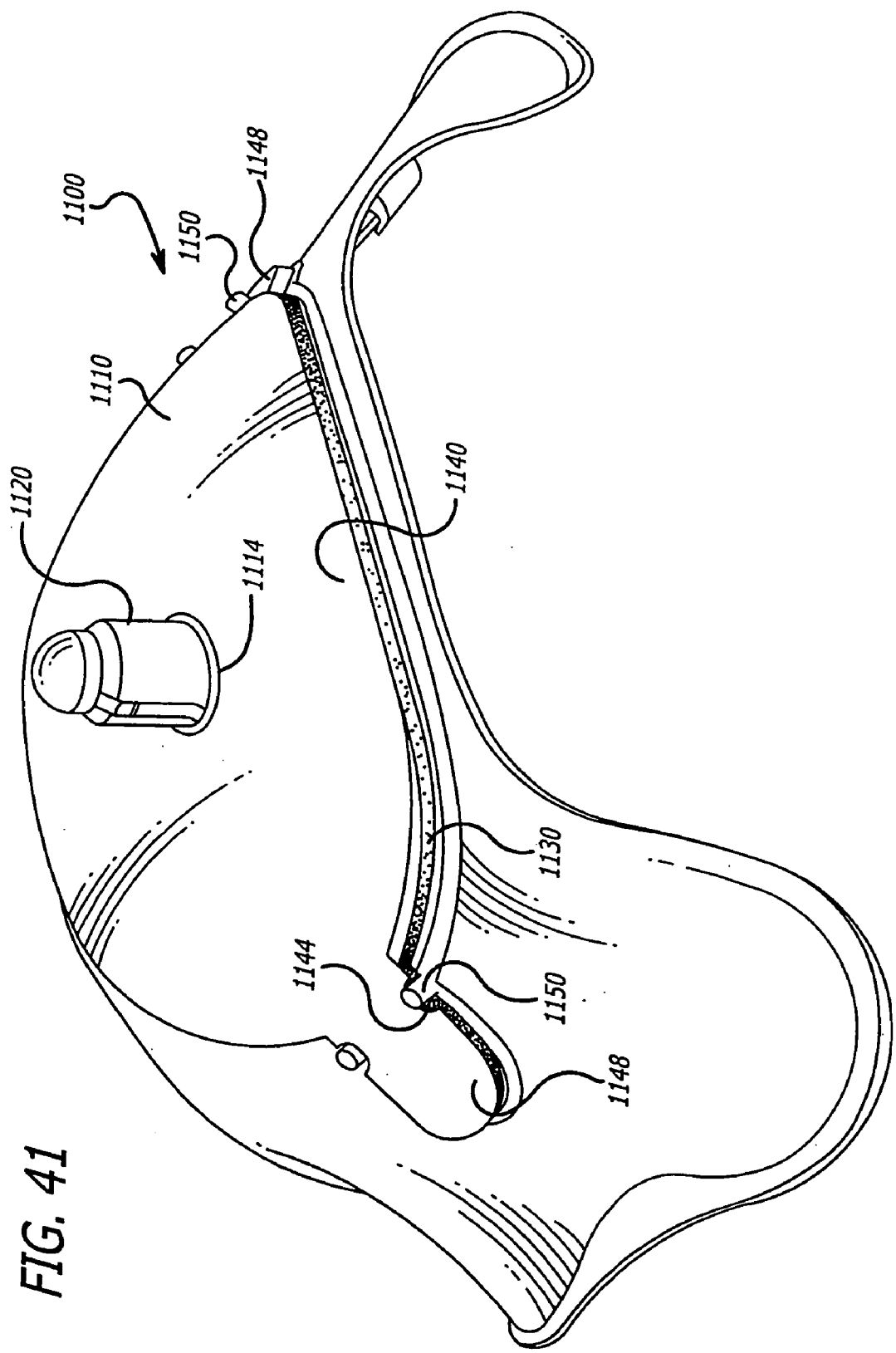

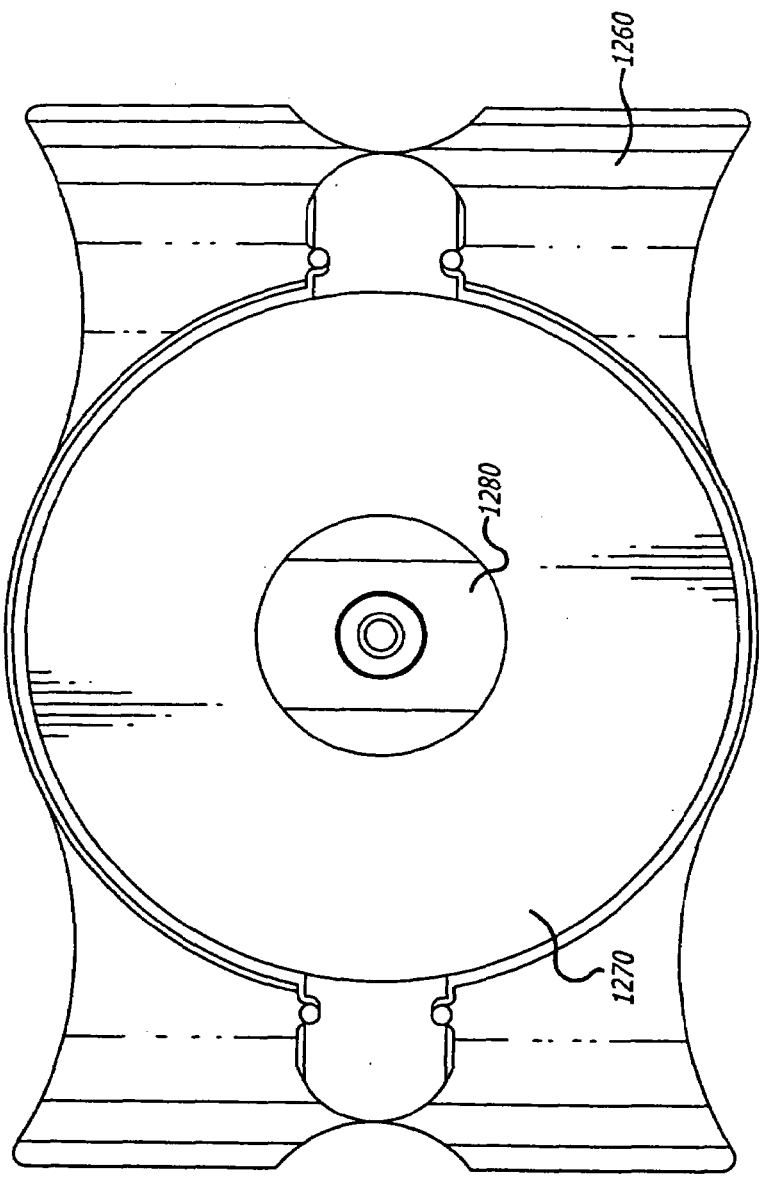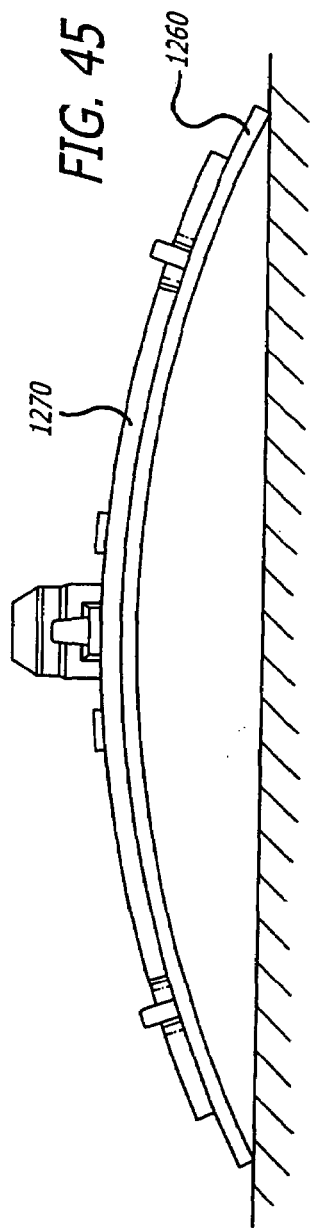
FIG. 44
FIG. 45

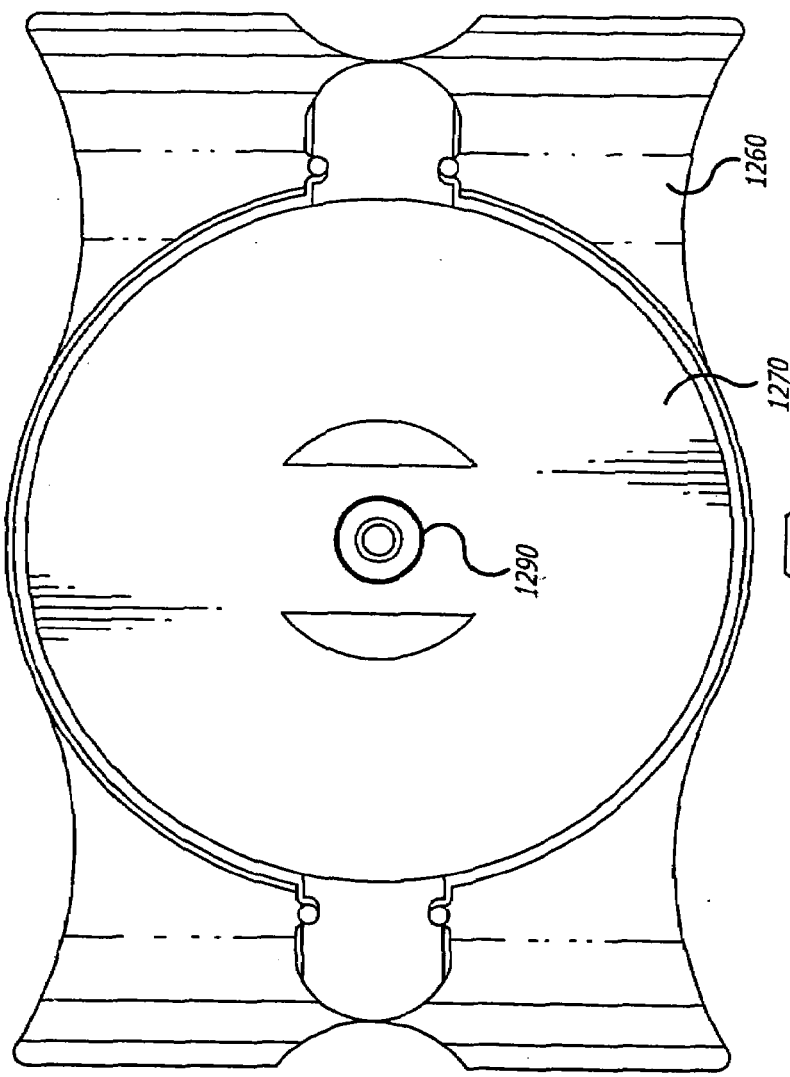
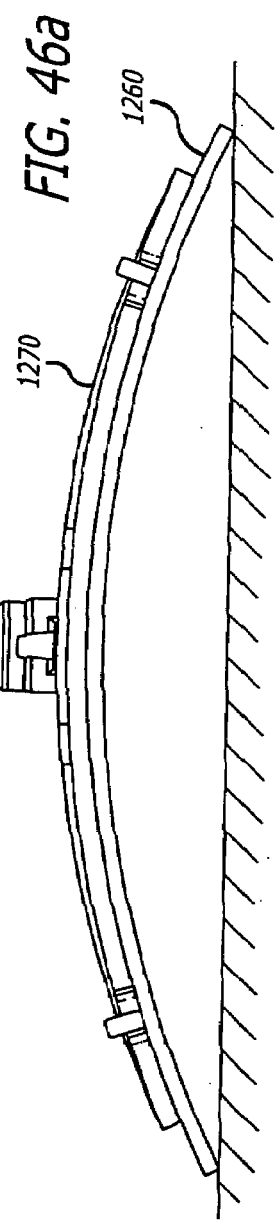
FIG. 46
FIG. 46a

METHOD FOR APPLYING LABELS

CROSS-REFERENCE TO RELATED APPLICATIONS

This is a divisional of copending U.S. patent application Ser. No. 10/296,480, filed May 12, 2003, which is a national stage entry of PCT International Application PCT/US01/16648, filed May 22, 2001, which claims the benefit of Provisional Application No. 60/283,062, filed Apr. 11, 2001, Provisional Application No. 60/248,147, filed Nov. 13, 2000, and U.S. patent application Ser. No. 09/575,396 filed May 22, 2000, which issued as U.S. Pat. No. 6,803,084 on Oct. 12, 2004. The entire contents of each of these applications are hereby incorporated by reference.

BACKGROUND OF THE INVENTION

The present invention relates to label sheet constructions and particularly those having labels designed for application to compact discs. It more particularly relates to such labels that are cut in a facestock sheet that is releasably adhered to a liner sheet to form a label sheet. The label sheet is adapted to be fed into a printer or copier and the desired indicia printed on the labels, and the printed labels peeled off of the liner sheet to be applied to a compact disc, either directly or using an alignment apparatus. The present invention also relates to sheet constructions, systems and methods for applying labels to tabs of divider sheets, to tabs of file folders, to envelopes and the like.

Commercially successful compact disc label sheets are currently available from Avery Dennison Corporation of Pasadena, Calif., as well as other manufacturers. After the labels have been printed, they must be removed from the sheet prior to application to the compact discs or the like. Removal of the labels exposes the adhesive side of the label which must be handled in order to place the label either directly onto the compact disc or in an apparatus designed to align the labels concentrically with the compact disc. Handling of the adhesive side of the label can result in a loss of adhesive tack due to contamination in the area where it was handled, contributing to poor adhesion to the compact disc in the contaminated area. Additionally, adhesion of the label to the user's fingers can increase the level of dexterity required to accurately place the label in its desired location.

One known label application method and system is provided in the INDEX MAKER Clear Label Dividers product available from Avery Dennison Corporation of Pasadena, Calif. This product includes a sheet having columns of clear labels thereon attached with adhesive to a releasable liner sheet. The clear tab labels are formatted using preset layouts and existing word processing software. The tab titles are printed onto the clear label sheet using laser or inkjet printers. The printed tabs are then manually peeled off from the sheet and individually applied to the divider tabs. This system allows the user to individually custom design and print each of the tabs with the desired indicia. The clear labels virtually disappear on the divider tabs giving the dividers a clean, professional look. Formatting can use preset layouts and existing software programs such as MICROSOFT Word for Windows, COREL Word Perfect for Windows, COREL Word Perfect for DOS, LOTUS Word Pro, and LOTUS AMI Pro. The following U.S. Patents are related to this prior art product: U.S. Pat. Nos. 5,135,261, 5,340,427 and 5,389,414. (All patents and other publications mentioned anywhere in this disclosure are hereby incorporated by reference in their entireties.)

Application of these labels can be time consuming, clumsy and subject to error, since they must be separated and then attached individually to the corresponding divider tabs. In the process of individually applying them, they often are not applied evenly or properly with the divider tab sheets. In other words, the above-described INDEX MAKER product has the problem that the labels are difficult and time consuming to remove from the backing sheet and to place and align on the tabs so they are straight. They are also small and cumbersome to handle.

Accordingly, a method for remedying these problems was designed and provided in U.S. Pat. No. 5,947,525 to Pollman. The Pollman patent teaches using at least one set of precut labels removably attached to carrier strips that are removably secured to a backing sheet. The precut labels are spaced apart on the carrier strips to align substantially on the tabs on the divider sheets. The user can separate a carrier strip and precut labels affixed thereto from the packing sheet, place and align the carrier strip across the divider sheet such that the precut labels are placed on the tabs of the divider sheets. He then pulls the carrier sheet upwardly and away from the divider sheet such that the precut labels separate from the carrier strip and remain on the divider's tabs. This system, while an improvement in certain respects over the prior art, has the disadvantage that the strips are typically flimsy and difficult to properly align. Additionally, the carrier strip can be sticky and thus may stick to unwanted surfaces.

SUMMARY OF THE INVENTION

Disclosed herein are an improved label sheet construction and a method of removing labels therefrom. The construction includes a face stock sheet releasably adhered to a liner sheet. The face stock sheet is die cut to form at least one and preferably two compact disc labels, as well as at least one and preferably two tabs for each compact disc label. Each tab is located so that one edge of the tab is in contact with one of the compact disc labels. If there are two tabs on one compact disc label, they are preferably located at diametrically opposed positions. The edges where the tabs are in contact with the compact disc labels are perforated, having a plurality of uncut segments commonly called "ties," alternating with cut segments commonly called "cuts." The liner side of the tab also has a die cut patterned so that it generally follows the outline of the tab, but which forms a shape that is inside of and slightly smaller than the face cut tab pattern.

After the label sheet has passed through a printer or copier and the desired indicia has been printed on the labels, at least one of the tabs is pushed through from the reverse side of the sheet, partially separating the tab from the rest of the sheet. For some label constructions, if there is a second tab, it is preferably pushed through from the reverse side as well. The distance between the tab face cut and the parallel liner cut can be varied in the design to improve functionality, preferably being narrower at the outer extremity, so that the outer edge separates from the rest of the sheet more easily, improving the probability that the perforated edge adjacent to the compact disc label will remain intact. There may or may not be one or more ties in the liner cut near the outer extremity in order to maintain the integrity of the sheet during the manufacturing and printing processes. The tab, which is mostly free of exposed adhesive in that it is still laminated to the die cut section of release liner, is then grasped from the face side, and lifted upward, pulling the compact disc label away from the label sheet. If there is a second tab on the label, this is also removed as the label is removed, and can be grasped by the user's other hand in order to control the position of the label. The user is now able to position the label either directly onto the compact disc or into an alignment apparatus, without any significant contact to an adhesive coated surface. Once the label has been applied to the compact disc, the tabs may be removed by pulling them away from the compact disc, causing the perforation between the tab(s) and the compact disc label to separate.

Disclosed herein is an apparatus for removing and positioning compact disc labels without touching any adhesive-coated surface. The apparatus includes one or two tabs attached to the compact disc label. Another aspect of this disclosure is a novel method of removing compact disc labels without touching an adhesive surface by pushing the tab from behind or pulling the tab from the front and lifting the label.

An alternate embodiment of the present invention includes one or more tab handles in combination with the jewel case alignment tab as described in U.S. Pat. No. 5,715,934. This provides a method of positioning the label in the jewel case so that it is properly aligned with and compact disc without handling the adhesive coated surface.

Various other label applicator constructions are disclosed herein. Each includes facestock adhered with releasable adhesive to a liner sheet. Die cut lines are made through the facestock but not through the liner sheet; and die cut lines are made through the liner sheet but not the facestock. Portions of the label sheet are then stripped away. Using different patterns of the die cut lines or other weakened separation lines and stripped away portions, the different label applicator constructions are formed. Each is a sheet construction with a plurality of small elongate labels formed from the liner sheet and releasably held to the facestock. The sheet construction is passed through a printer and the desired indicia printed on the labels. The printed labels are then ready for easy controlled removal and application by the user to tabs of index dividers, file folders or the like.

According to one definition of the invention, the label sheet is die cut on both the face and liner to facilitate the application of labels onto the dividers and file folders. The label sheet has die cuts that are oriented thereon to allow them to be aligned with either one or more sets of dividers or sets of file folders. The liner is die cut so that a strip can be removed directly from behind the labels, exposing the adhesive side of the labels. The labels are also temporarily held onto the remainder of the sheet by small ties. Removal of the liner from the label sheet allows the user to align the tabs over the substrate using the rest of the label sheet as a carrier. The application of the labels is followed by removal of the label sheet that breaks the ties, leaving just the labels on the substrate. The label applicator construction includes a pressure sensitive laminate material die cut on both the face and liner and sheeted to a standard-size sheet. The facestock of the pressure sensitive laminate material can be either paper or coated film that is toner or ink receptive. The adhesive can be permanent or removable, depending on the level of adhesion needed for the end user.

A first construction/method of the invention is for applying multiple labels on tab dividers/file folders. The label sheet includes die cuts that are oriented on the sheet in a way that allows them to be aligned with the set of tabs if a set of dividers were stacked on top of each other. The liner is die cut so that a strip, positioned directly behind the labels, can be removed, exposing the adhesive side of the labels. The labels are also temporarily held on the label sheet by small ties. The removal of the liner from the label sheet allows the user to align the tabs over the divider set using the label sheet as a carrier. Once the labels are affixed to the tabs, the user pulls away the label sheet to break the ties, leaving only the labels affixed to the tabs.

An alternate method for placing multiple label on tab dividers/file folders uses a label sheet which includes labels arranged in a way similar to the first method. In this method, the liner is die cut in the shape of the row of labels. The labels are exposed by removing the strip of liner directly behind the labels. Next, a set of dividers is placed on the exposed adhesive using the outline of the removed liner as a guide. After the labels have been pressure applied to the tabs, the label sheet is pulled away, leaving the labels affixed to the tabs.

A second construction/method is for applying single labels onto substrate. In this method, individual labels are placed on the substrate one label at a time. On both short sides of the label, there are "handles" that are held onto the label by small ties. These handles are used to hold the labels over the desired position and used to align the labels. After placing the labels on the desired location, the handles are removed by pulling laterally away from the label.

An alternate construction/method uses a single "handle" on the label. In this method, individual labels are placed on the substrate by using a single handle as an alignment tool. The handles are once again held onto the labels by small ties that are designed to be broken after the label has been placed in its desired location.

A third construction/method uses multiple sets of tab dividers placed in a device that uses pouches that are tiered. A set of dividers is placed in each of the pouches. The dividers are positioned such that when a label sheet, such as the one described in the first method, is aligned with the top row of tabs, all others will also be aligned. This allows the user to label multiple sets of dividers in a single operation.

Thus according to one of the present inventions, disclosed herein is a facestock which is adhered with adhesive to a liner sheet. Weakened separation lines in the facestock define lines of facestock labels. And weakened separation lines in the liner sheet define liner sheet strips separable from the body of the liner sheet to expose backsides of respective lines of labels. The rest of the liner sheet can then be manipulated to position the line of labels on staggered tabs, the labels pressed into position and separated from the rest of the facestock. Another embodiment includes facestock sheet separation lines defining the perimeters of facestock labels with at least one facestock handle attached thereto. The liner sheet includes a portion attached to the handle whereby the handle, the label and the portion are removable as a unit from the liner sheet and the facestock, the handle manipulated to position the label so that its adhesive backside is positioned and applied at the desired surface location, and the handle and portion then separated from the label.

Other objects and advantages of the present invention will become more apparent to those persons having ordinary skill in the art to which the present invention pertains from the foregoing description taken in conjunction with the accompanying drawings.

BRIEF DESCRIPTION OF THE DRAWINGS

FIG. 3 Is an enlarged cross-sectional view taken on line 3-3 of FIG. 1;

FIG. 4 is a perspective view of a first application step by a user of a label unit of the construction of FIG. 1;

FIG. 5 is a perspective view of a second application step;

FIG. 6 is a perspective view of a third application step;

FIG. 9 is an enlarged cross-sectional view taken on line 9-9 of FIG. 7;

FIG. 10 is a perspective view showing a first application step by a user of a label unit of the construction of FIG. 7;

FIG. 11 is a perspective view of a second application step;

FIG. 12 is a perspective view of a third application step;

FIG. 25 is an enlarged cross-sectional view taken on line 25-25 of FIG. 23;

FIG. 26 is a perspective view of the construction of FIG. 23 passing through a printer;

FIG. 29 is a perspective view of a third step;

FIG. 30 is a perspective view of a fourth step;

FIG. 41 is a perspective view of a label assembly of the present invention shown in place on a label applicator device;

FIG. 44 is a top perspective of another label assembly of the present invention shown in position on another label applicator device;

FIG. 45 is a side elevational view of FIG. 44;

FIG. 46 is a view similar to FIG. 44 showing a full face label;

FIG. 46a is a side elevational view of FIG. 46;

DETAILED DESCRIPTION OF PREFERRED EMBODIMENTS OF THE INVENTION

A number of different label applicator constructions of the present invention are disclosed herein and will now be described. Generally speaking, each is formed as a sheet construction having a liner sheet with a facestock attached to the back side thereof. One embodiment is to form the sheet construction as a laminate having an ink and/or laser receptive top coat facestock laminated with pressure sensitive adhesive to a release-coated paper liner. The facestock has weakened separation lines formed therein to define a plurality of facestock labels. And weakened separation lines in the liner sheet form the liner sheet so it can be separated into portions to assist in the proper placement of the facestock labels on the tabs of the index dividers, file folders or the like. More particularly, the weakened separation lines of the liner sheet allow the liner sheet to be separated such that one or more portions of the liner sheet can be manually handled by the user in the placement of the facestock labels so that he need not touch the labels. Additionally, the liner sheet portions thereby defined help the user properly position the facestock label(s) on the tab(s). As will become apparent from the following detailed descriptions, some of the embodiments herein allow the user to individually remove and manipulate labels and others allow for an entire line or row of labels to be essentially simultaneously applied to a line of stacked, staggered tabs in a manner that is an improvement over the problems experienced with the Pollman method.

The weakened separation lines can be formed by generally any known method. A preferred method for many of the lines is to die cut them. Each of the die cut lines typically will penetrate only one of the liner sheet or the facestock sheet. And the die cut portions of the liner sheet or facestock sheet are maintained on the label applicator sheet construction by the adhesive so that they will not separate from the sheet while the sheet is being passed through a printer or copier. Instead of die cutting, the weakened separation lines can be formed by perforated lines or other means as would be apparent to those skilled in the art.

Figure 1:
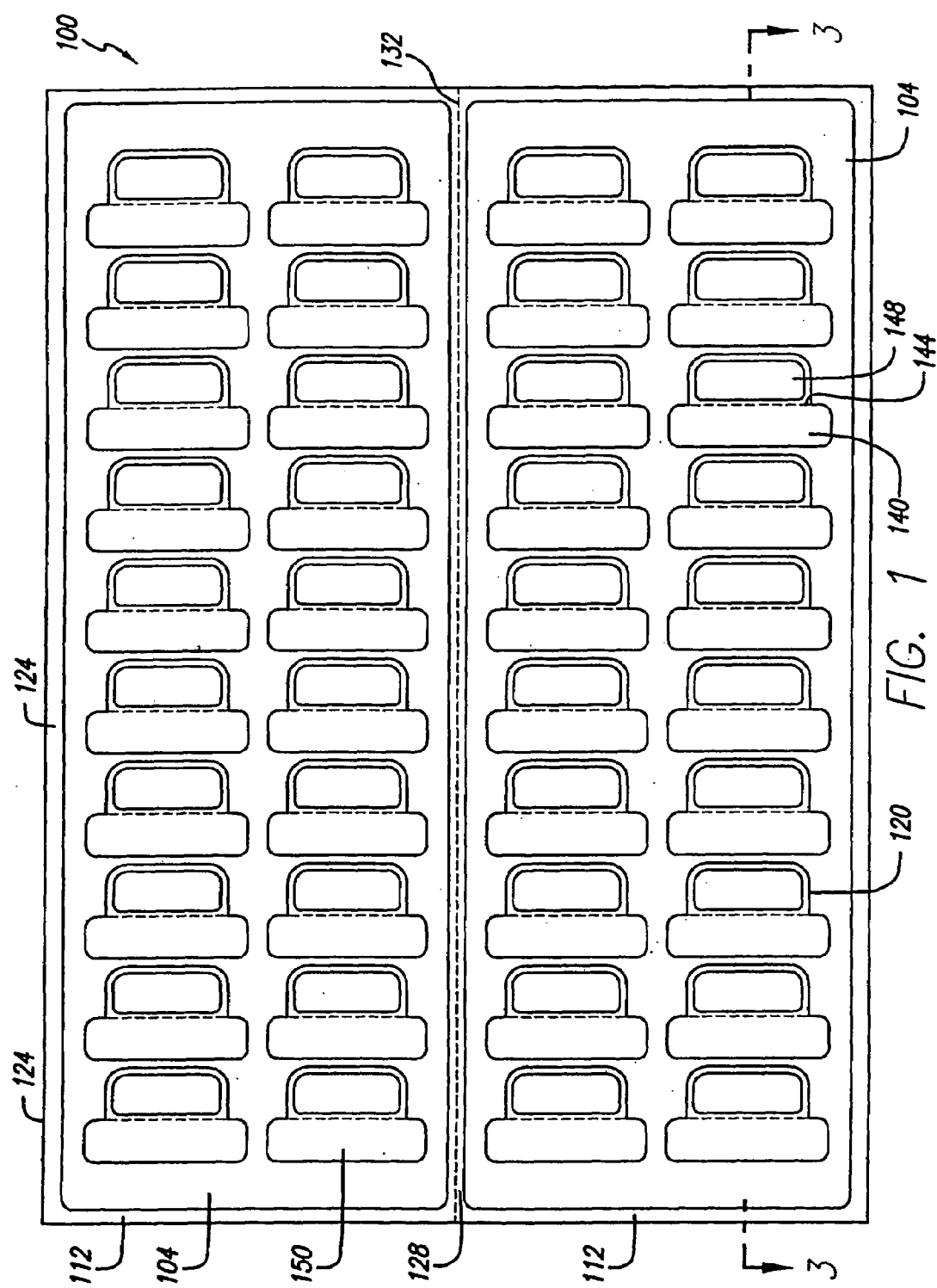
FIG. 1 is a front view of a first label applicator construction of the present invention.
Figure 2:
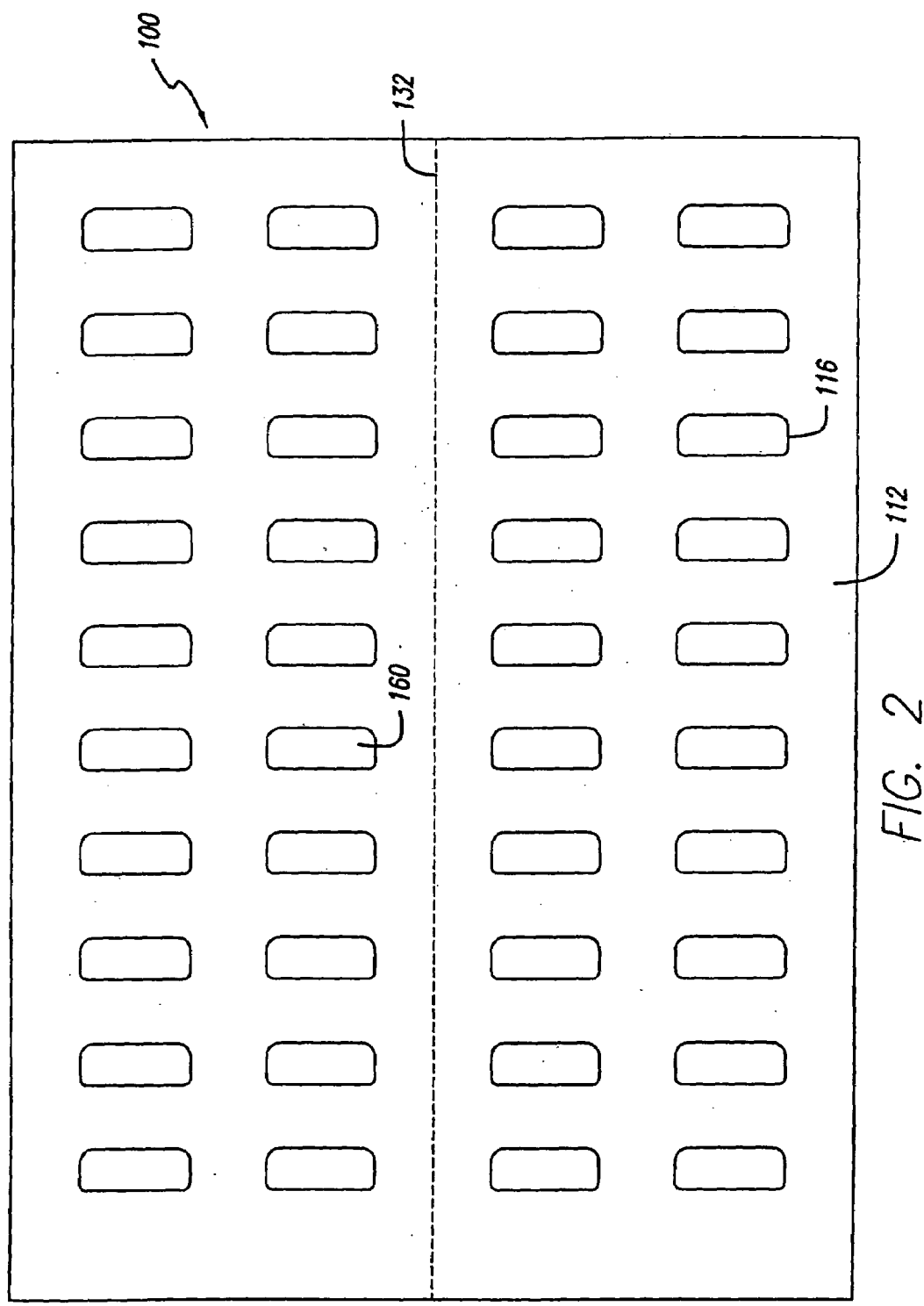
FIG. 2 Is a rear view of the construction of FIG. 1.
Figure 7:
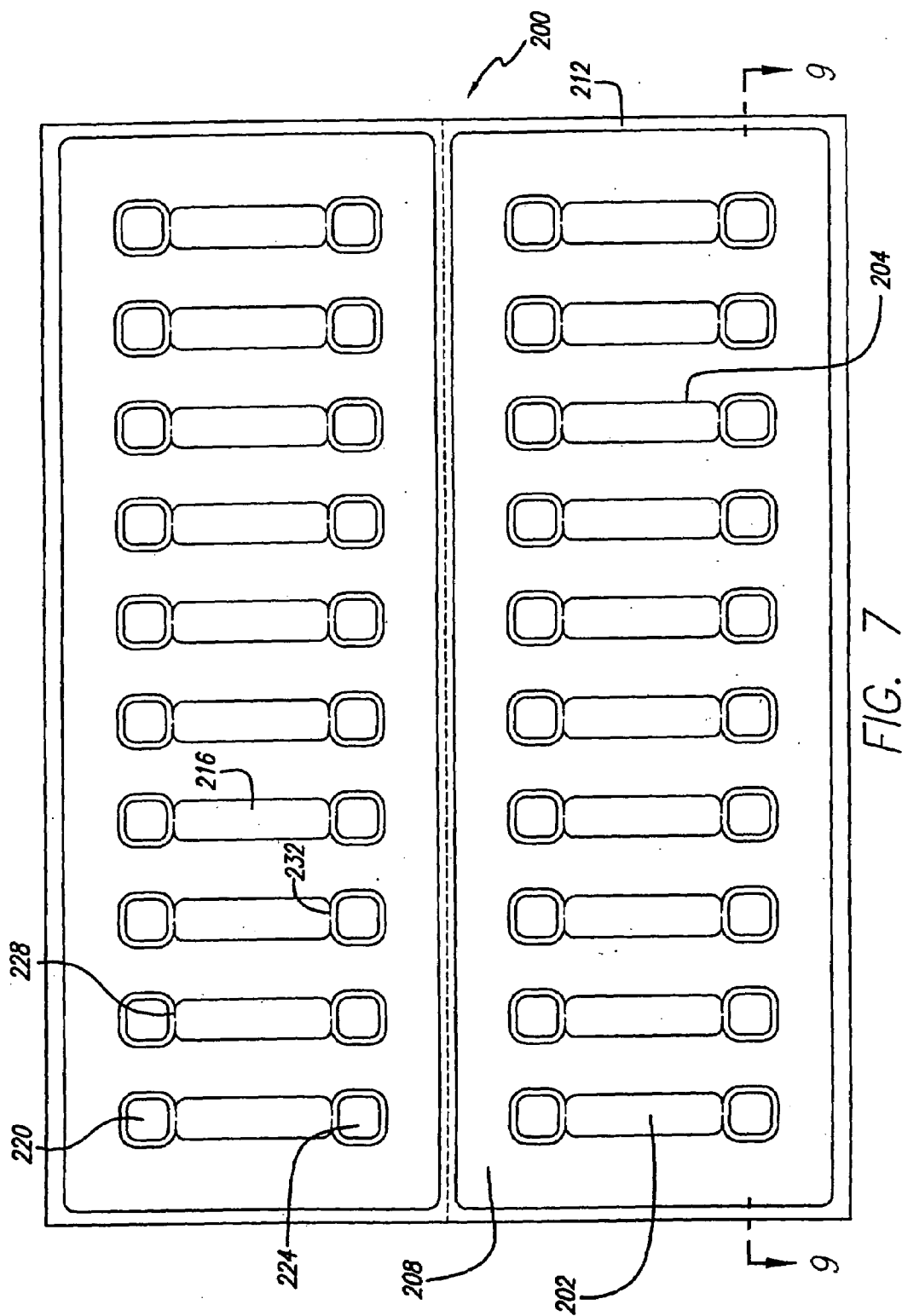
FIG. 7 is a front view of a second label applicator construction of the present invention.
Figure 8:
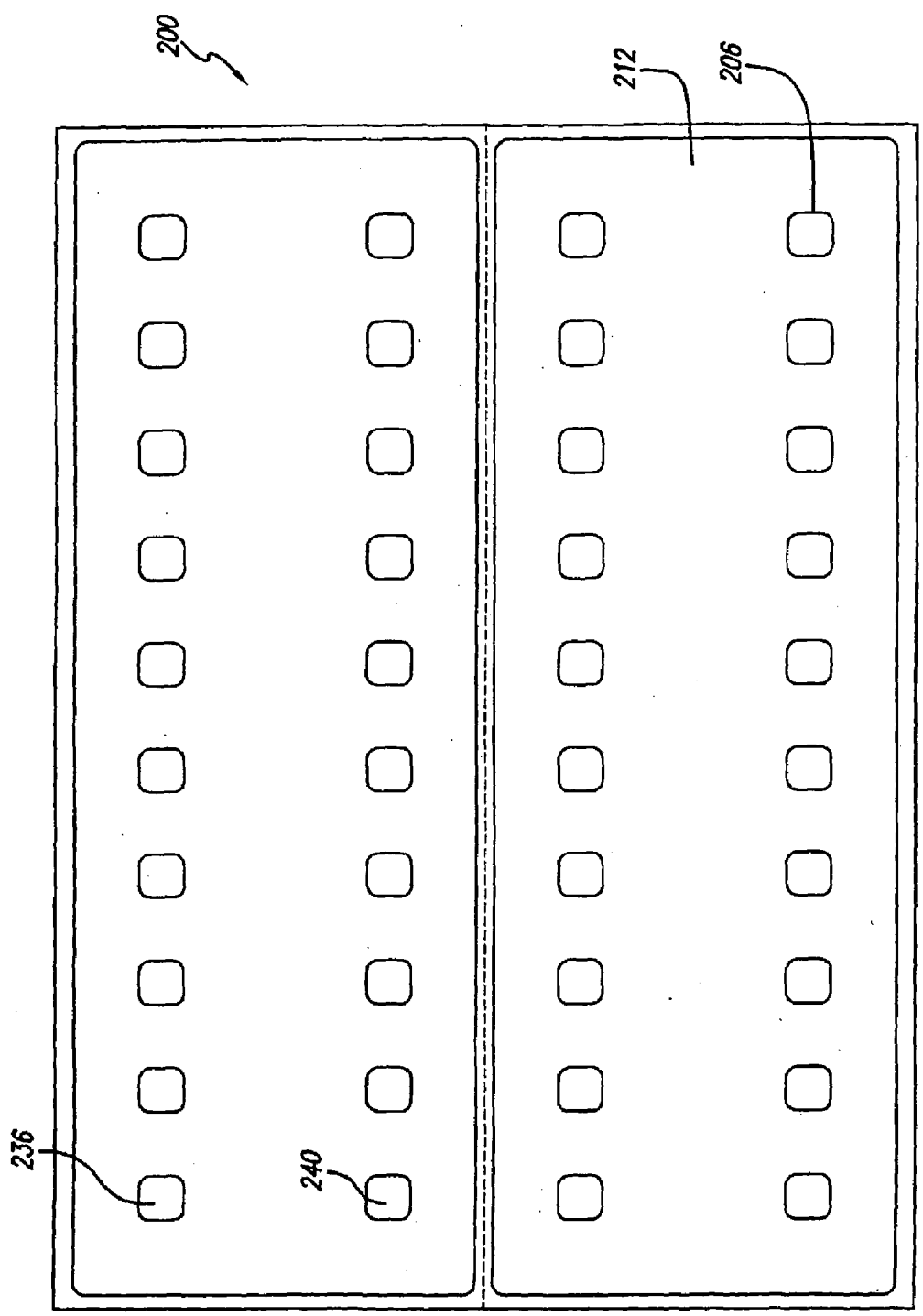
FIG. 8 is a rear view of the construction of FIG. 7.

A first label applicator construction of the present invention is shown in FIGS. 1 through 6, generally at 100. It can be understood from FIG. 3 that the facestock sheet 104 is attached with adhesive 108 to the liner sheet 112. Both the liner sheet 112 and the facestock 104 have die cut lines. The pattern for the die cut lines 116 of the liner sheet 112 is best shown in FIG. 2, which is the rear view of the sheet. FIG. 1 then shows the pattern of the die cut lines 120 in the facestock 104; and as can be understood therein and also from FIG. 3, portions of the facestock have been stripped away to form the edge margins 124 of the construction. These margins are provided to reduce the curl on the label sheets. Additionally, a gutter strip 128 has been removed from the center and a perforation line 132 formed down the center of the liner sheet 112. This allows the construction 100 to be divided into two parts by the user. Two smaller label applicator construction sheets are thereby formed for passing through the printer or as may be desired by the user.

Referring to FIG. 1, the facestock sheet is cut by the die cut lines 120 into four columns of ten rows of labels. Of course, different numbers of columns and rows or different patterns (non-matrix) of the labels can be used as needed. Each of the facestock labels has a two part construction, each having a large rounded corner rectangle 140 attached with a perforated line or ties 144 to a smaller rounded corner rectangle 148. And the liner sheet is then cut to define a similar number of columns and rows of small rounded corner rectangles 160, each positioned on the back of the respective rounded corner rectangles 144 of the label and adhered thereto by the adhesive 108. The smaller facestock label rectangle 148 defines a handle portion of the label unit 150, and the larger rectangle 140 defines the actual facestock label of the unit 150 on which indicia 164 is printed. A respective liner sheet 160 rectangle is adhered to this handle portion 148 of the unit 150.

The sheet construction 100 is passed through a printer or a copier, such as shown in FIG. 26 at 170. And the desired indicia 164 are printed on the facestock label portion 140 of the unit 150. It is anticipated that all of the facestock labels 140 will be printed in a single pass through the printer 170. However, it is within the scope of the invention to print less than all of them and then pass the sheet through a second, third, or more times to print on the remaining labels. Alternatively, the user can hand write on some or all of the labels 140.

After the label 140 has been printed, or handwritten thereon, with the desired indicia 164, the label unit 150 is pulled off the rest of the sheet, as shown in FIG. 4, by the user grasping the liner sheet portion 160 and the handle portion 148 and removing them along their die cut lines from the surrounding liner sheet and facestock sheet and pulling the label portion 140 off of the underlying liner sheet with adhesive 108 remaining on the bottom portion of the label. The user then manipulates the label portion 140 into a desired position on the tab 174 by holding and manipulating the facestock handle portion and the attached liner sheet portion, as shown in FIG. 5, between his thumb 178 and forefinger 182. The label 140 is then pressed down by the user and adhered with the adhesive 108 in the desired position on the tab 174. The handle portion with liner sheet portion attached thereto are separated from the printed adhered label by tearing along the perforation line or ties 144 as shown in FIG. 6. Thereby the printed label 140 is accurately positioned by the user and without the user touching the label portion and thereby dirtying it or smudging it with body oils from the user's fingers or the user's fingers adhering to the adhesive.

FIGS. 7 through 12 illustrate a second label applicator construction of the present invention generally at 200. It is seen therein that it is conceptually similar to the construction 100 in that removable label units 202 are defined by die cut lines 204, 206 in the facestock 208 and in the liner sheet 212, and adhesive 214 is provided between the sheets. However, instead of the facestock portion being formed by a large elongate rectangle defining the label with a smaller elongate rectangle parallel thereto along a side edge defining the handle portion, a different configuration is shown in construction FIG. 7. Although the unit 202 of FIG. 7 includes a similar elongate rectangular facestock label 216, facestock handle portions 220, 224 are formed at each end thereof and with perforation lines or ties 228, 232 between the ends of the facestock label and both of the handle portions. Similarly, liner sheet portions 236, 240 are die cut on the backs of each of the facestock handle portions 220, 224, respectively. The liner sheet portions 236, 240 have slightly smaller dimensions than the respective handle portions 220, 224, defining a thin facestock margin about the perimeter of the liner sheet portions.

After the sheet 200 has been passed through a printer or a copier and the desired indicia 250 printed on the labels 216, as shown in FIG. 10, the two end handle portions 220, 224 and liner sheet portions 236, 240 are grasped and pulled away from the sheet and the facestock label 216 peeled off from the liner sheet 212 with a layer of adhesive on the back of the label. With the two handle portions grasped by the user, the label unit 204 is positioned such that the label 216 is in the desired position on the tab 254 as shown in FIG. 11, and the label 216 is then pressed into position. The two handle portions 220, 224 are then pulled away along the perforation lines 228, 232 from the ends of the adhered label, as depicted in FIG. 12. Thereby, similar to the sheet 100, the facestock label 216 itself is never touched by the user.

Referring to FIGS. 13 through 19, a third label applicator construction sheet of the present invention is shown generally at 300. It is seen also to comprise a liner sheet 304 and a facestock 308 attached with adhesive 312 to the face of the liner sheet. Similar to the other constructions disclosed herein, margin edges 316 of the facestock have been cut and removed as well as a center gutter portion 320 and a perforation line 324 through the liner sheet and down the middle of the liner sheet as formed. The facestock has been die cut to form lines 3-28 of spaced rounded corner rectangular labels 332, each connected to adjacent labels with thin strips 336 and with the die cut line extending from the end labels to the edge of the facestock. The liner sheet 304 is die cut 340 with end lines extending all the way to but spaced a small distance to form a small break-away tie at the edge of the sheet. The die cut lines extend in a distance and then extend down, across and up, parallel to the outer shape of the adjacent label but spaced outwardly a slight distance therefrom and extending out to form a small plateau 350 between adjacent labels similar to the spacing on the facestock sheet between the adjacent labels. The label liner sheet portions 354 are adhered to respective ones of the facestock labels 332 while the sheet is intact and passed through the printer or copier.

Figure 16:
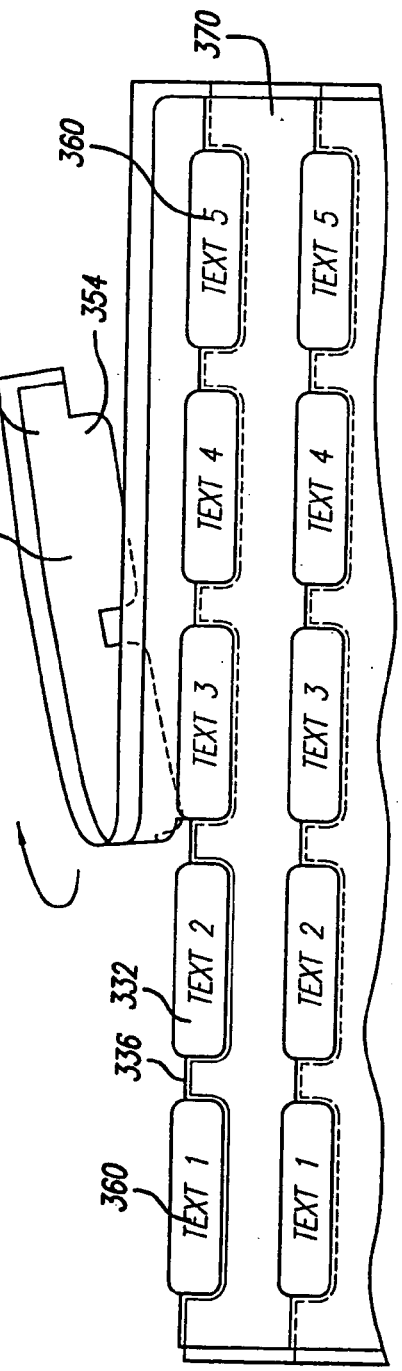
FIG. 16 is a perspective view of a top portion of the construction of FIG. 13 showing a first step for applying a first series of printed labels thereof.
Figure 17:
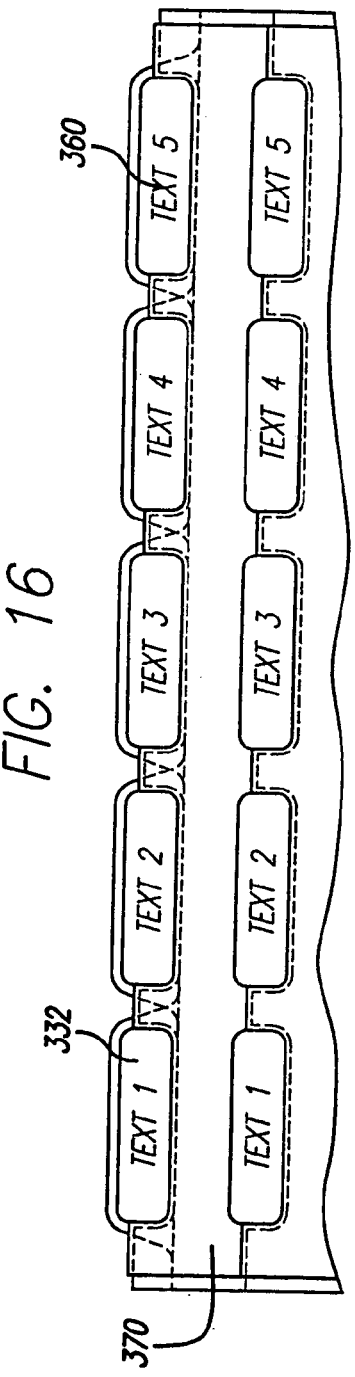
FIG. 17 is a perspective view of a second step.

After passing therethrough and with desired indicia 360 printed on the labels 332, the liner strip 364 at the top of the sheet is pulled away and separated from the remainder portion 370 of the sheet. The liner sheet portions mentioned above are removed with the liner sheet strip together with a liner sheet bar at the top 374. This step is shown in FIG. 16. The adhesive connection between the facestock and the liner sheet and the small ties at the end of the liner sheet cut lines, hold the sheet intact and prevent the liner strip 364 from separating before it is manually pulled away by the user after the printing. When it has been pulled away, the liner sheet portions 354 on the backs of the respective facestock labels 332 are removed thereby exposing the adhesive back sides of the line of labels 332 at the top of the remaining sheet portion 370. The top row of exposed labels 332 extends a slight distance out from the top edge of the sheet. The large remaining sheet portion 370 can then be manipulated by the user into the desired position aligned with the set of tab dividers 374 or file folders with their staggered tab 378. The body portion 370 provides a strong, not flexible or flimsy, handle for manipulating and accurately positioning the top row of exposed labels onto the desired positions on the staggered tabs as shown in FIG. 17.

Figure 18:
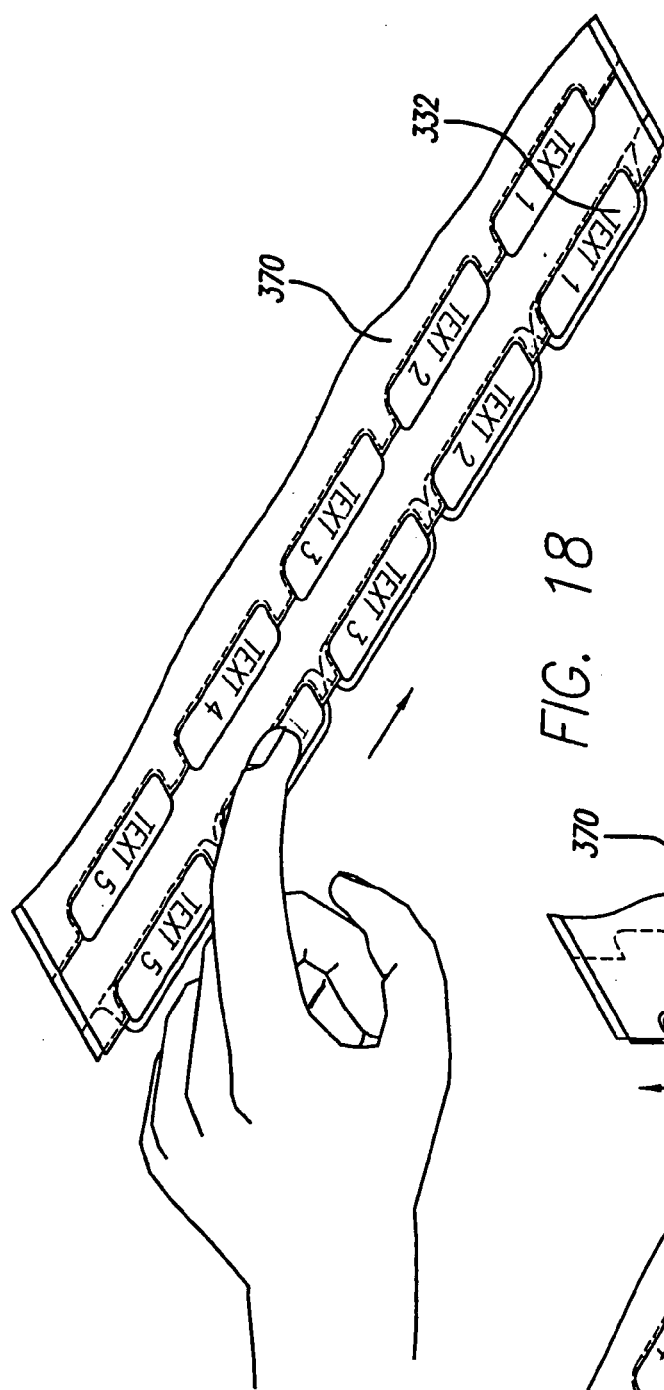
FIG. 18 is a perspective view of a third step.
Figure 19:
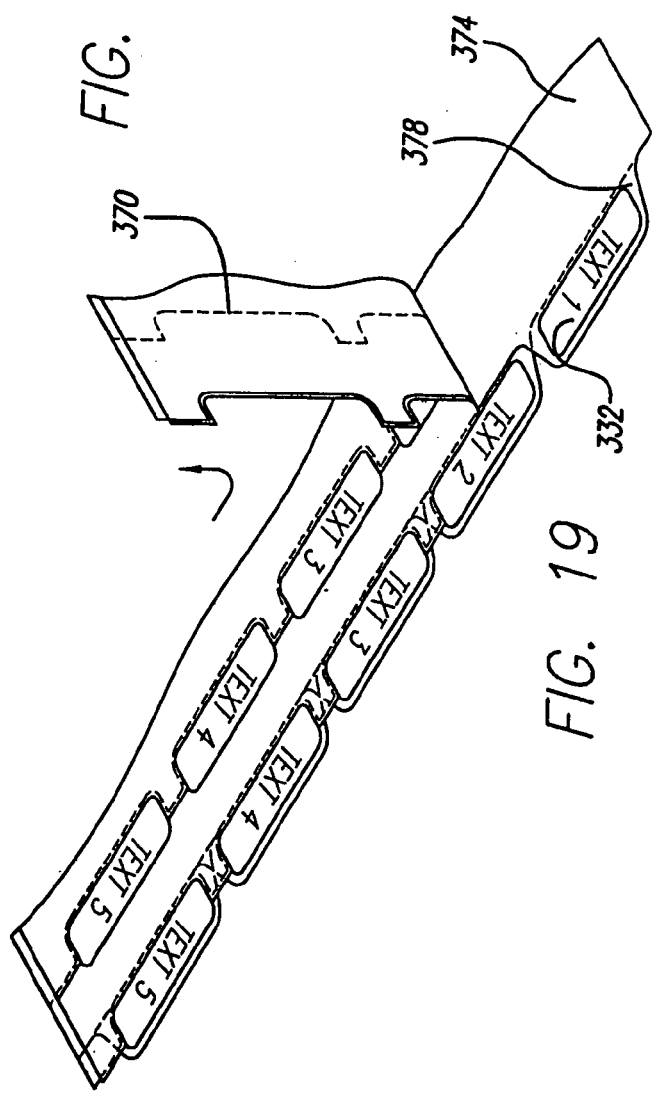
FIG. 19 is a perspective view of a fourth step.

Each of the properly positioned labels 332 is then pressed flat down to form a strong adhesive bond onto the respective tabs 378 as depicted in FIG. 18. The body handle portion 370 of the sheet is then pulled away from the adhered labels 332, breaking the thin facestock ties between the adjacent labels and leaving the labels in position. Referring back to FIG. 15, the next top liner strip is removed to expose the backsides of the second line of printed labels. The second line of printed labels are then manipulated into position on a second set of staggered dividers, the labels pressed into position and the remaining smaller body portion removed. This can be understood by again viewing FIGS. 17 through 19.

Figure 13:
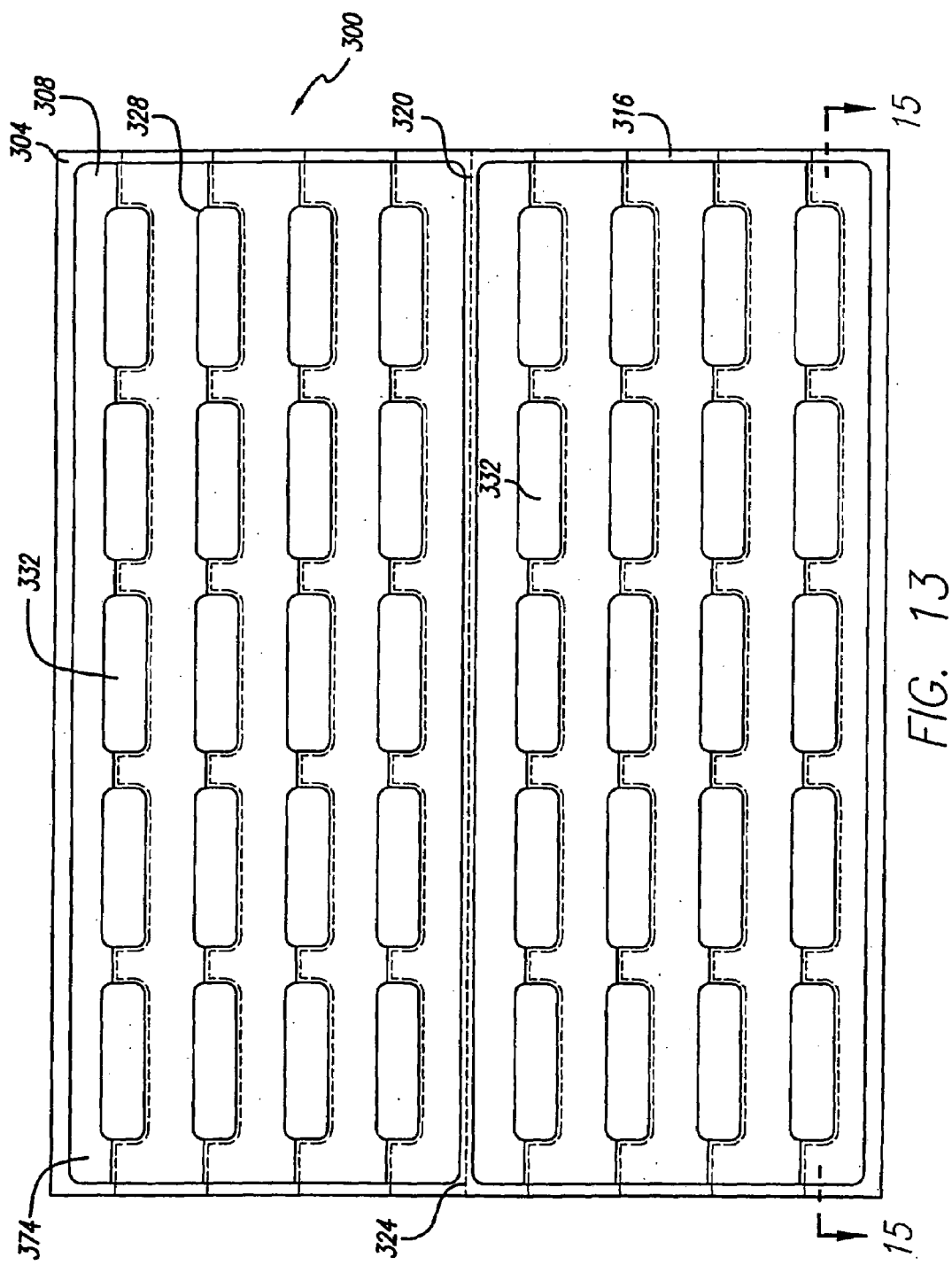
FIG. 13 is a front view of a third label applicator construction of the present invention.
Figure 14:
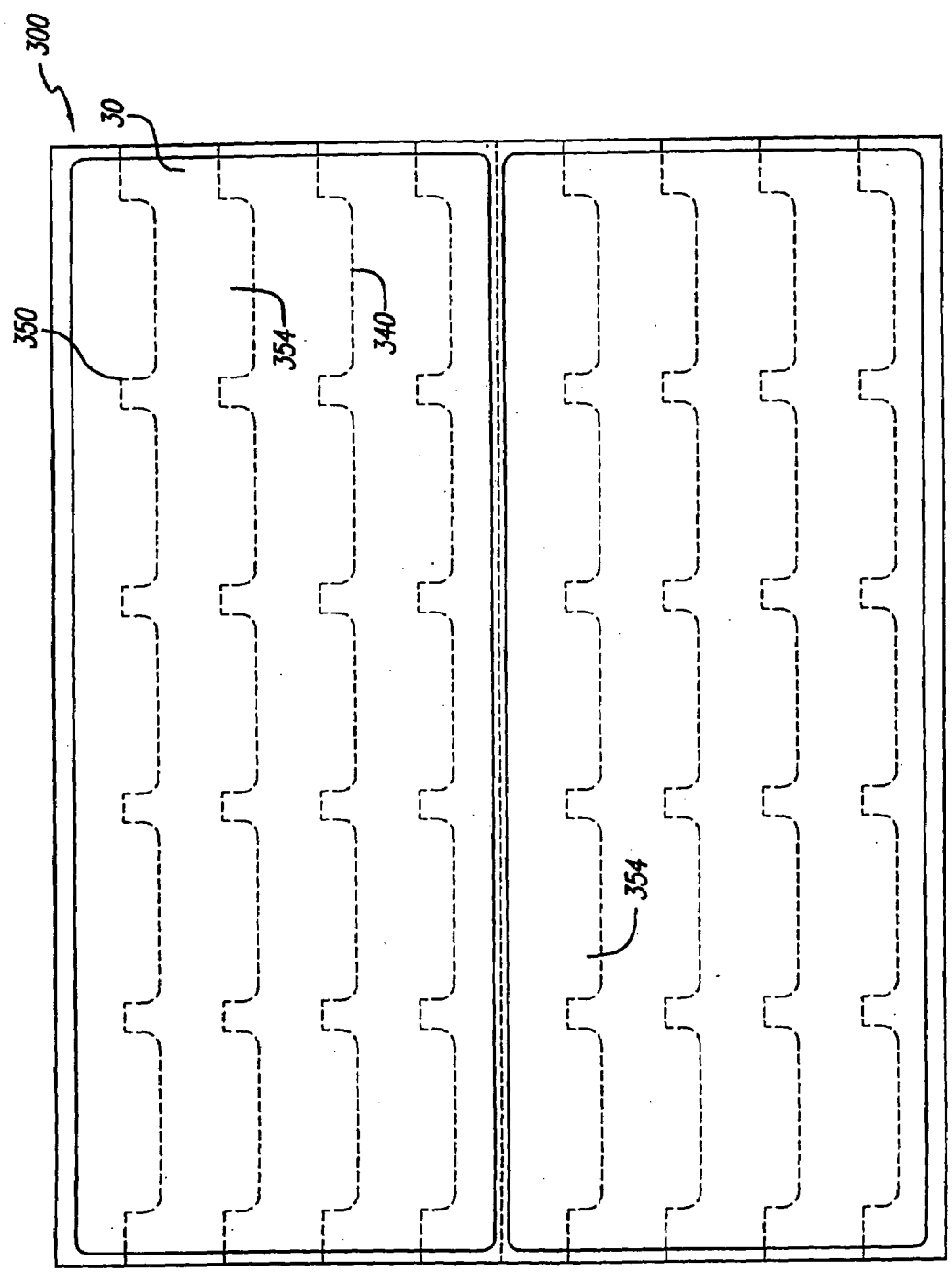
FIG. 14 is a rear view of the construction of FIG. 13.
Figure 15:
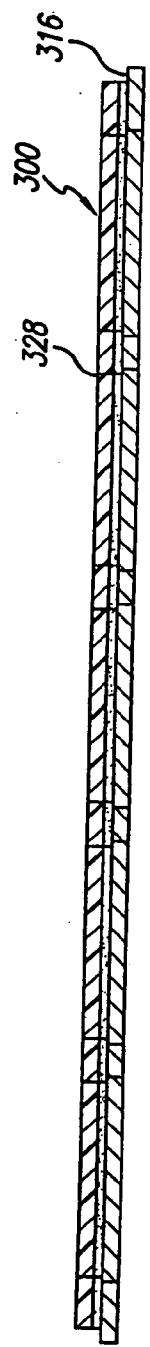
FIG. 15 is an enlarged cross-sectional view taken on line 15-15 in FIG. 13.
Figure 20:
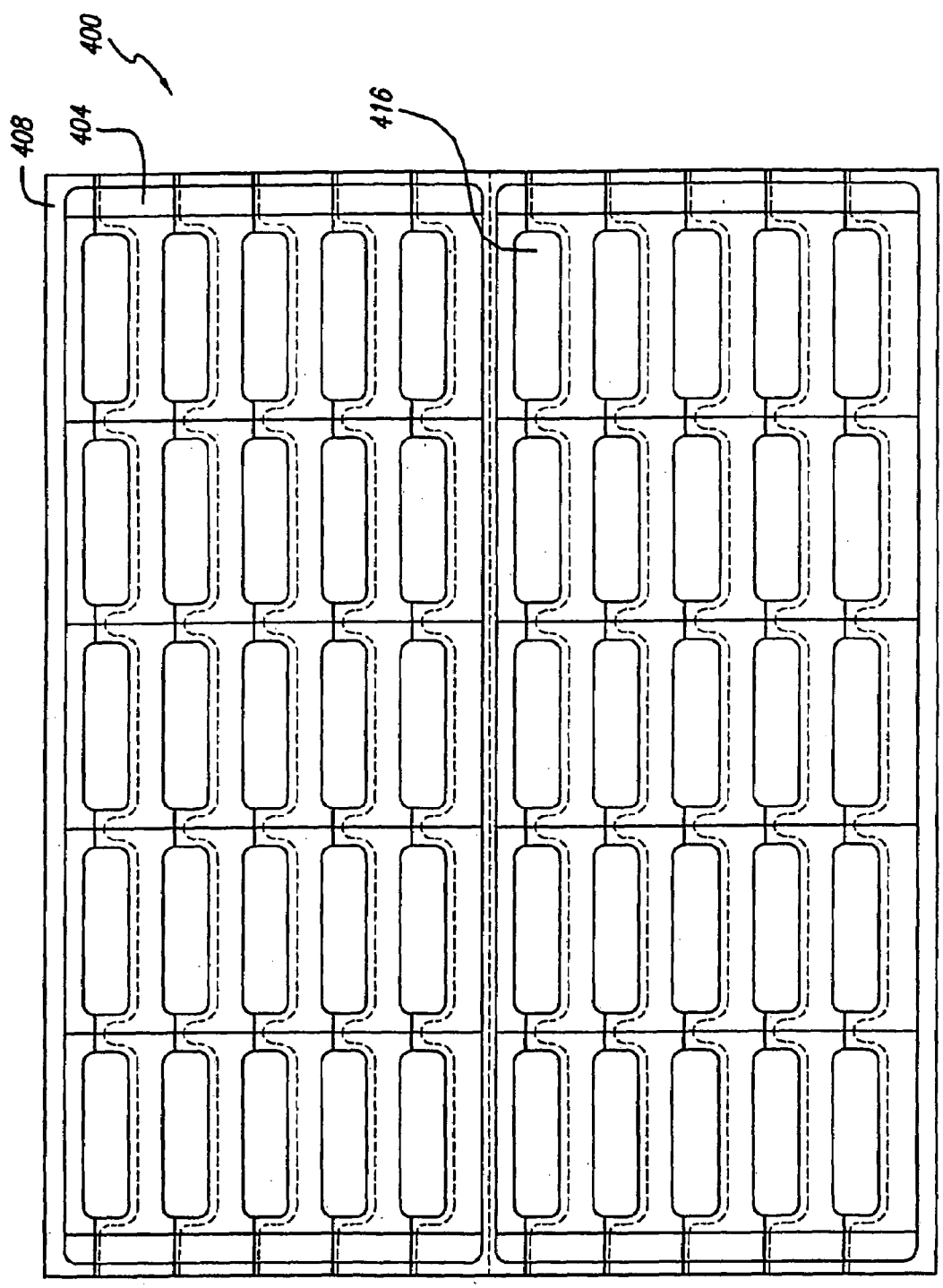
FIG. 20 is a front view of a preferred alternative embodiment of the third label applicator construction.

The fourth embodiment of FIG. 20, shown generally at 400, is an improvement over the embodiment of FIG. 13, and a number of small differences are apparent. It similarly includes facestock 404, liner sheet 408, adhesive, and cut lines to form labels 416, strips, etc. One of the differences is that there is an increased offset between the face and liner cuts. Also, there are more rounded corners, additional ties are provided on the faces, additional ties are provided on the liners and additional rows of labels are provided. The face cuts are provided to relax the post-laser curl in laser printers.

Figure 21:
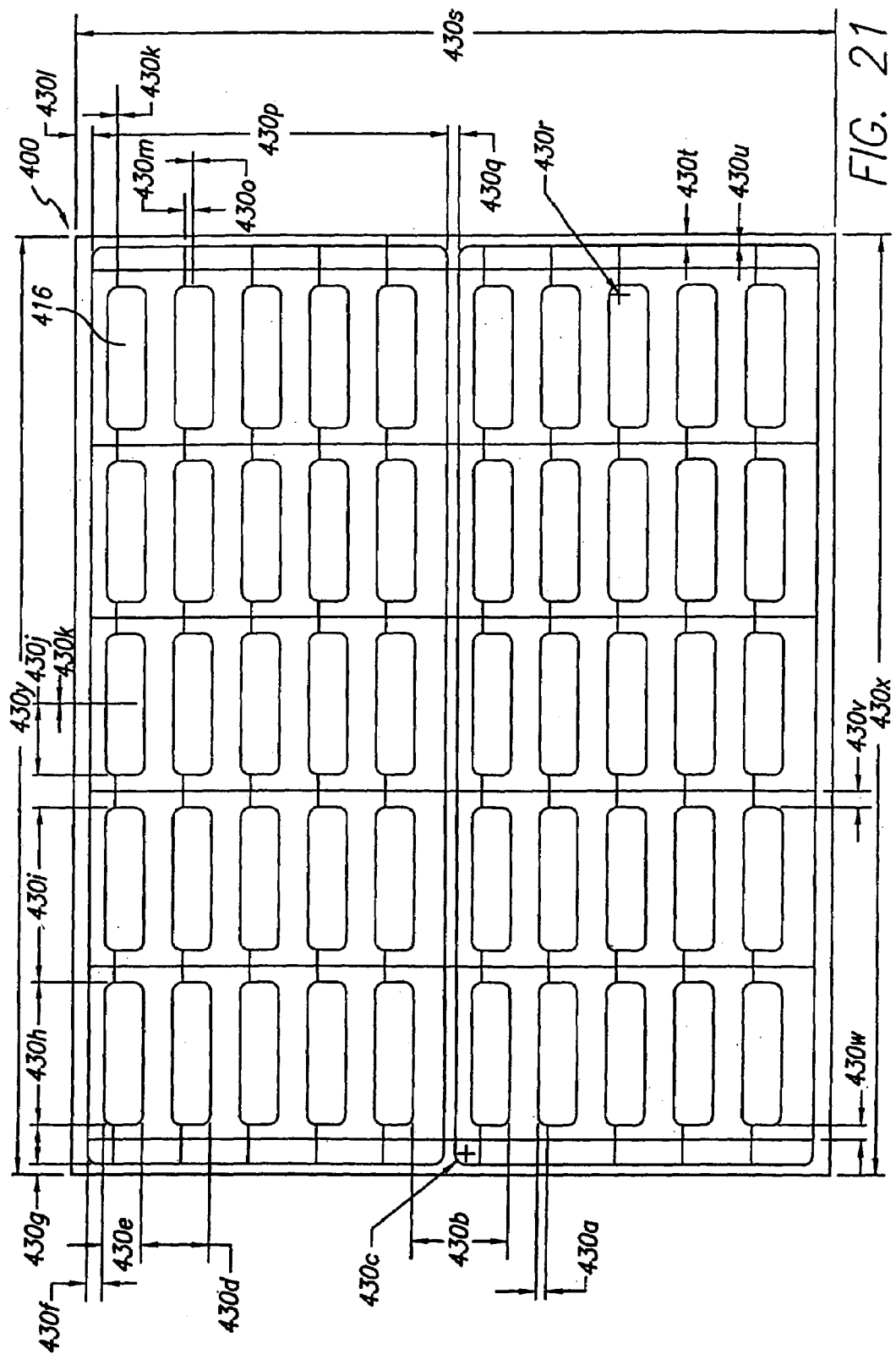
FIG. 21 is a view similar to FIG. 20 but with dimensions indicated thereon.

Referring to FIG. 21, preferred dimensions in inches are: 430a (0.063), 430b (1.251), 430c (R0.125 typical), 430d (0.750), 430e (0.438 typical), 430f (0.219), 430g (0.547), 430h (1.656 typical), 430i (2.031 typical), 430j (0.824 typical (this half of sheet only)), 430k (0.006 first row 0.008 second, third row; 0.010 fourth row tie typical (this half of sheet only)), 430l (0.187 ref.), 430m (0.094 typical), 430n (0.010 tie typical both sides), 430o (0.006 tie typical both sides), 430p (4.025 typical), 430q (0.075), 430r (R0.109 typical), 430s (8.500 web width ref.), 430t (0.063 typical), 430u (0.010 tie typical both ends), 430v (0.188 typical), 430w (0.188 typical), 430x (10.875) and 430y (11.000)

It can be seen that ten cavities are provided across by five around at 1.656 inches by 0.438 inch. Five ties per cavity as are provided on one-half of the sheet, and four ties per cavity on the other half of the sheet. The two surrounding cavities are 10.875 inches by 4.025 inches. The 1.5 mil polyester face is cut through to the 3.0 mil paper liner.

Figure 22:
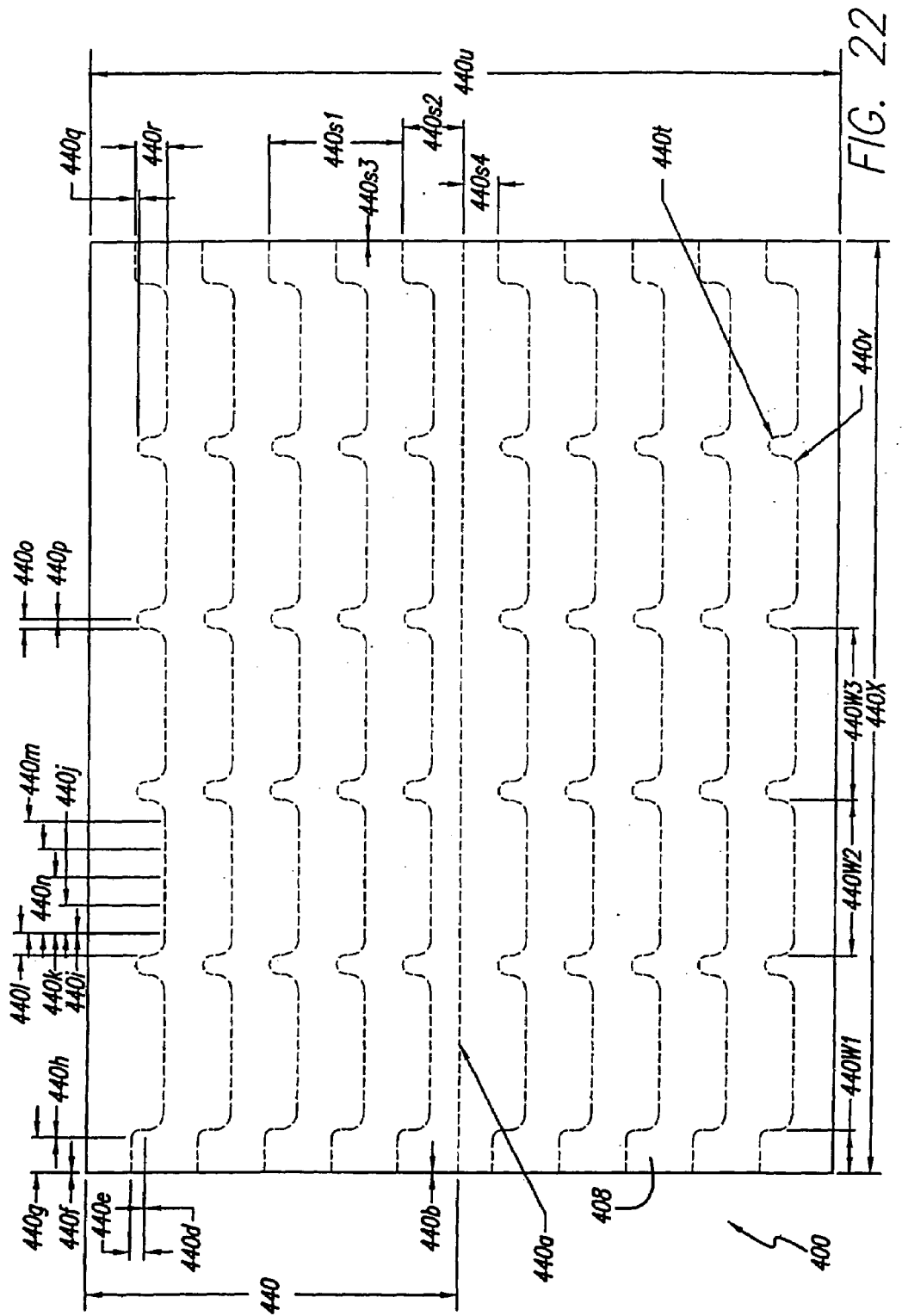
FIG. 22 is a rear view the embodiment of FIG. 20 with dimensions indicated thereon.

Referring to FIG. 22, preferred dimensions in inches are: 440a (⅛" cut×1/32" tie), 440b (0.031), 440c (4.250), 440d (0.015 tie typical both ends each repeat), 440e (0.235 both ends), 440f (0.031 tie typical), 440g (0.366), 440h (0.015 tie typical both ends), 440i (0.015 typical), 440j (0.313 typical), 440k (0.625 typical), 440l (0.243 typical), 440m (1.250 typical) 440n (0.938 typical), 440o (0.133 typical), 440p (0.015 tie typical), 440q (0.375 typical), 440r (0.437 typical), 440s1 (1.500), 440s2 (0.750 typical), 440s3 (0.031), 440s4 (0.500), 440t (R0.125 typical), 440u (8.500 web width), 440v (R0.188 typical), 440w1 (0.531 typical), 440w2 (1.750 typical), 440w3 (2.031 typical), 440x (10.938) and 440y (11.000 circumference)

Figure 23:
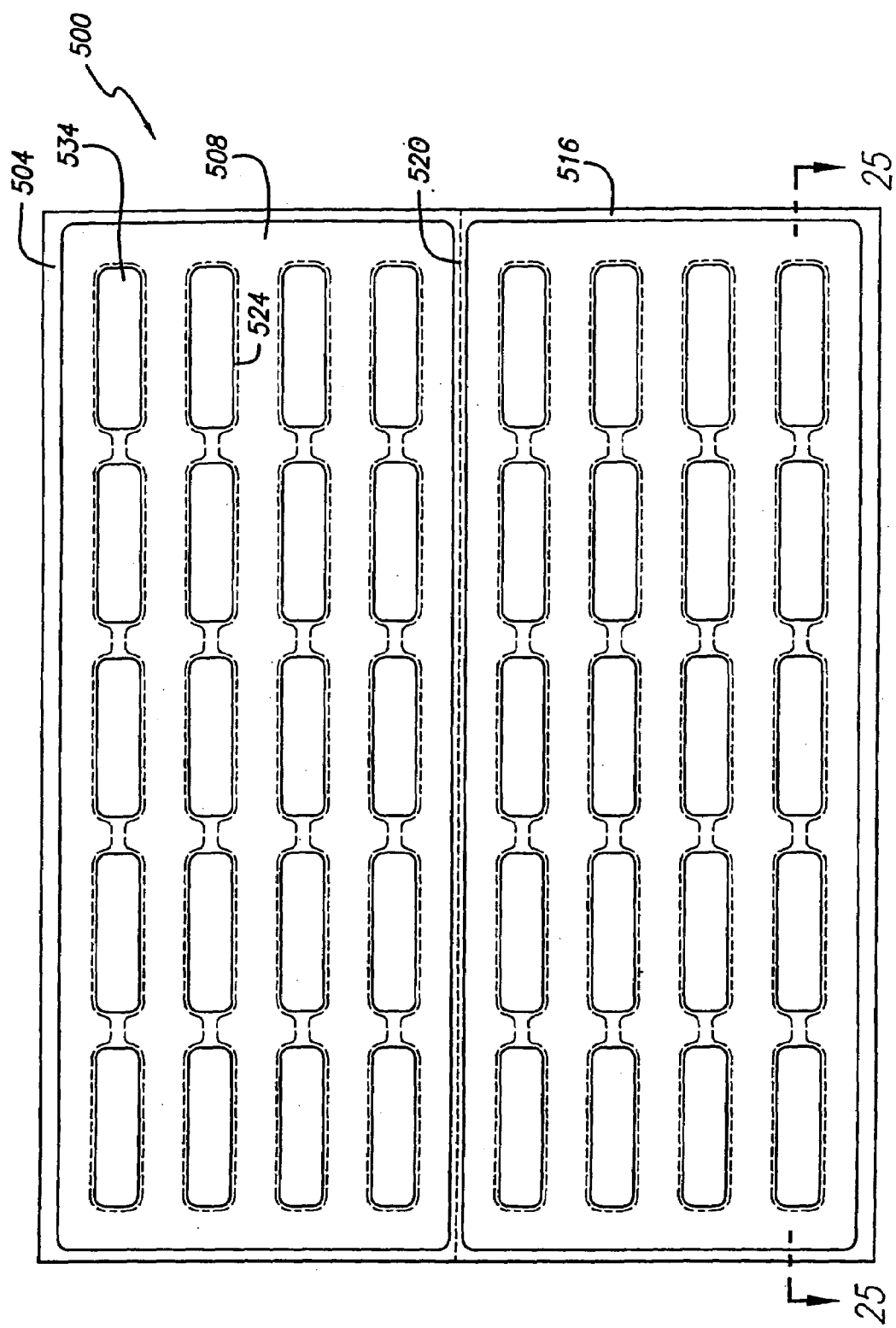
FIG. 23 is a front view of a fourth label applicator construction of the present invention.
Figure 24:
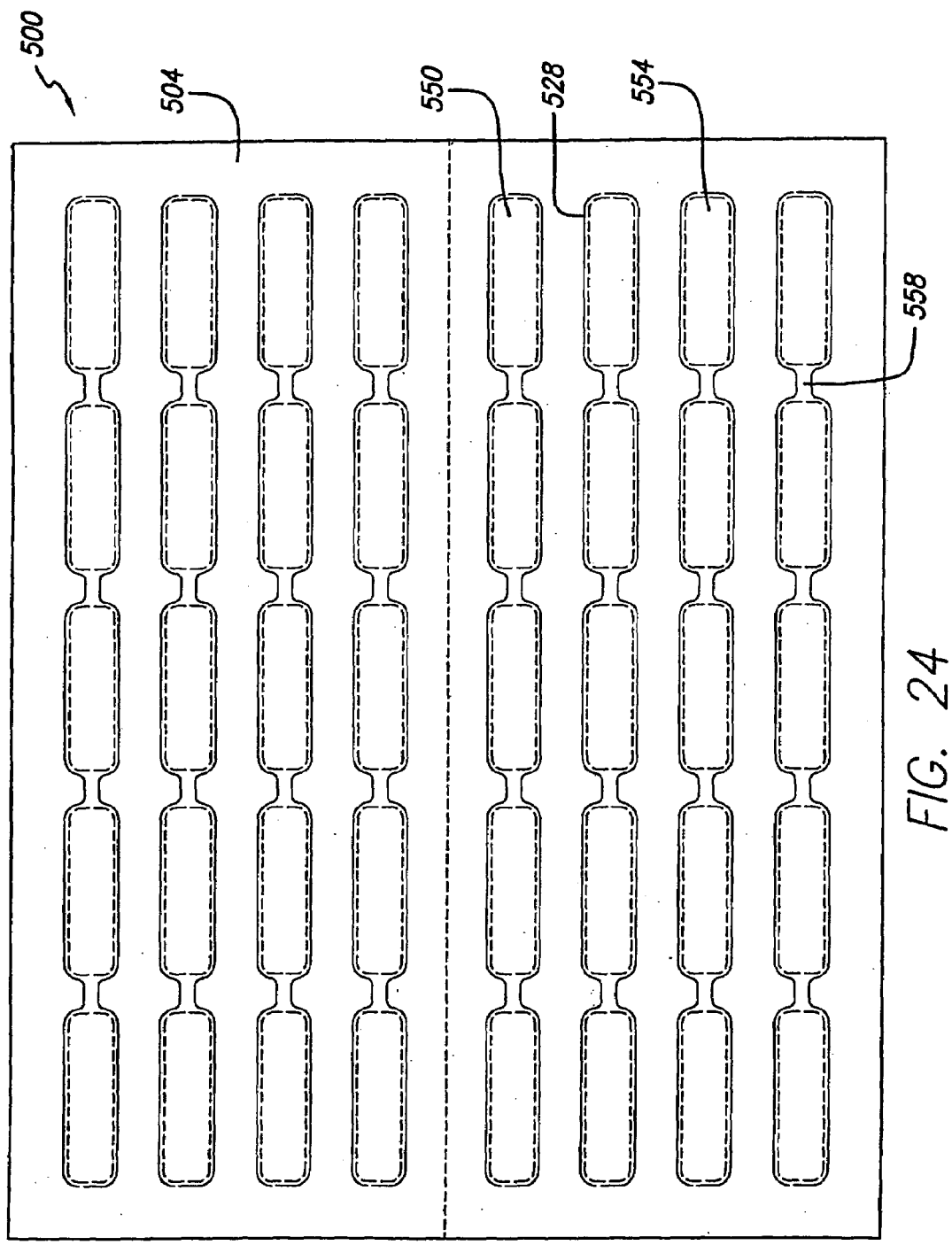
FIG. 24 is a rear view thereof.

Referring to FIGS. 23 through 30, a fifth label applicator construction of the present invention is shown generally at 500. It similarly includes the back liner sheet 504 and the facestock 508 adhered to a front surface thereof with adhesive 512, as shown in FIG. 25. Similarly, margin 516 and the center gutter portion 520 of the facestock have been cut and removed. Die cut lines 524, 528 are formed in both the liner sheet to but not through the facestock and through the facestock to but not through the liner sheet. The die cut lines 524 through the facestock form parallel rows of spaced rounded rectangular labels 534. For example, as shown in FIG. 23, eight rows of five labels are formed. Thin breakable facestock necks separate adjacent labels in each row.

The die cut lines 528 in the liner sheet 504 form a plurality of liner strips 550, each of the strips is comprised of a series of rectangular liner sheet portions 554 connected at the center ends to the adjacent liner sheet portions with necks 558. Each of the liner sheet portions 554 has the same shape but with slightly larger dimensions than the underlying and attached facestock label 534. The liner sheet necks 558 provide sturdy connections between the liner sheet portions 554 such that the entire strip 550 can be removed without the liner sheet portions 554 separating. It is removed after the sheet has been passed through a printer 170 and the indicia 560 printed on the top surfaces of the facestock labels as depicted in FIG. 26.

Figures 27, 28:
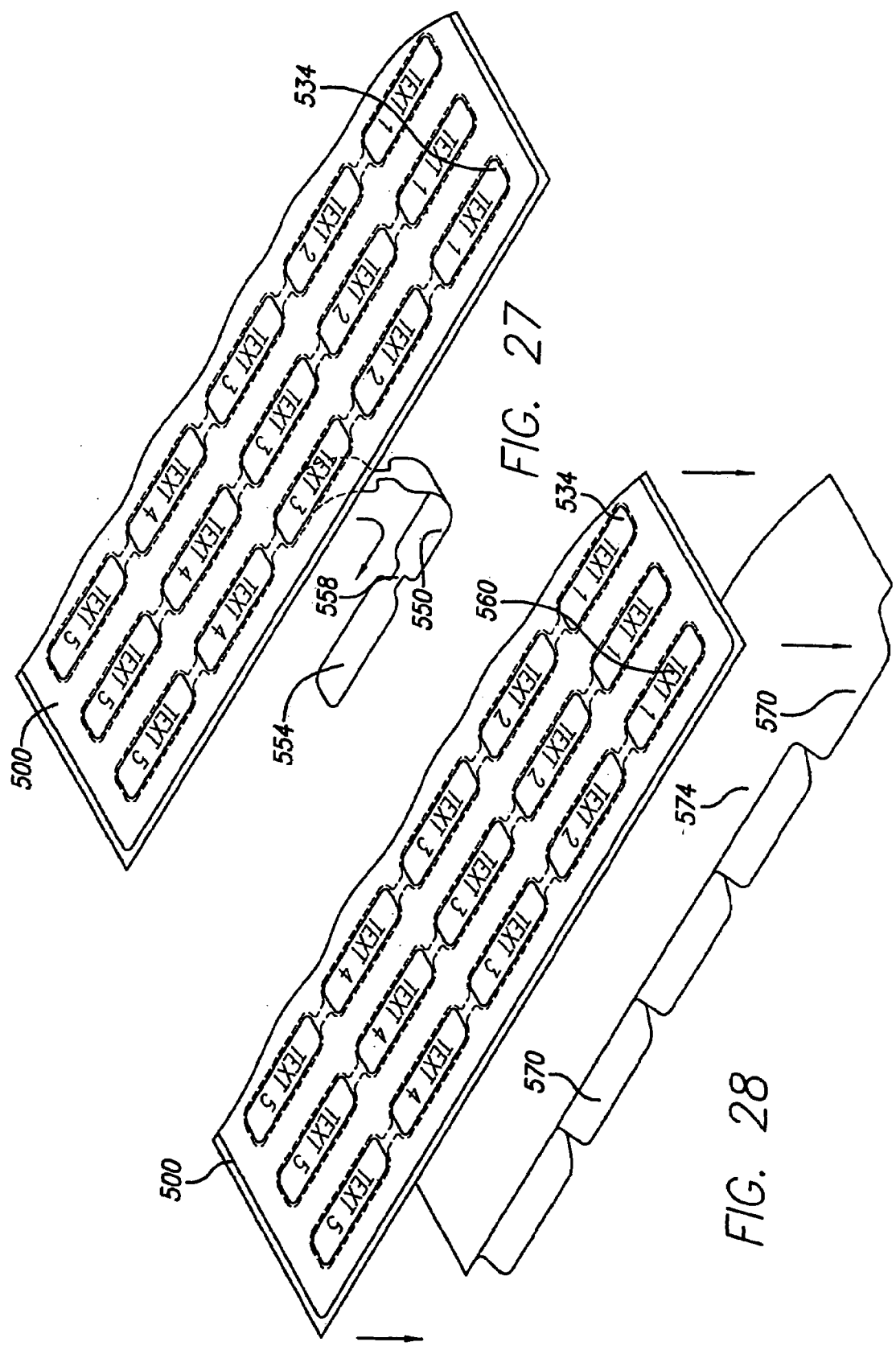
FIG. 27 is a perspective view of a top portion of the printed construction of FIG. 26 showing a first step for applying a first series of printed labels thereof.
FIG. 28 is a perspective view of a second step.

In other words, the liner sheet strip 550 is peeled off or removed from the sheet, leaving the exposed backsides of the respective adhesive labels 534. The sheet can then be manipulated such that the exposed backsides of the labels 534 are positioned on the respective stacked and staggered tabs 570 of the dividers or file folders 574 as shown in FIG. 28. The labels 534 are pressed down into position to provide a firm, straight adhesion of the labels to the tabs 570, as depicted in FIG. 29. The remainder of the sheet 578 is then pulled off of the labels 534 as shown in FIG. 30, leaving them properly applied on the tabs.

Figure 31:
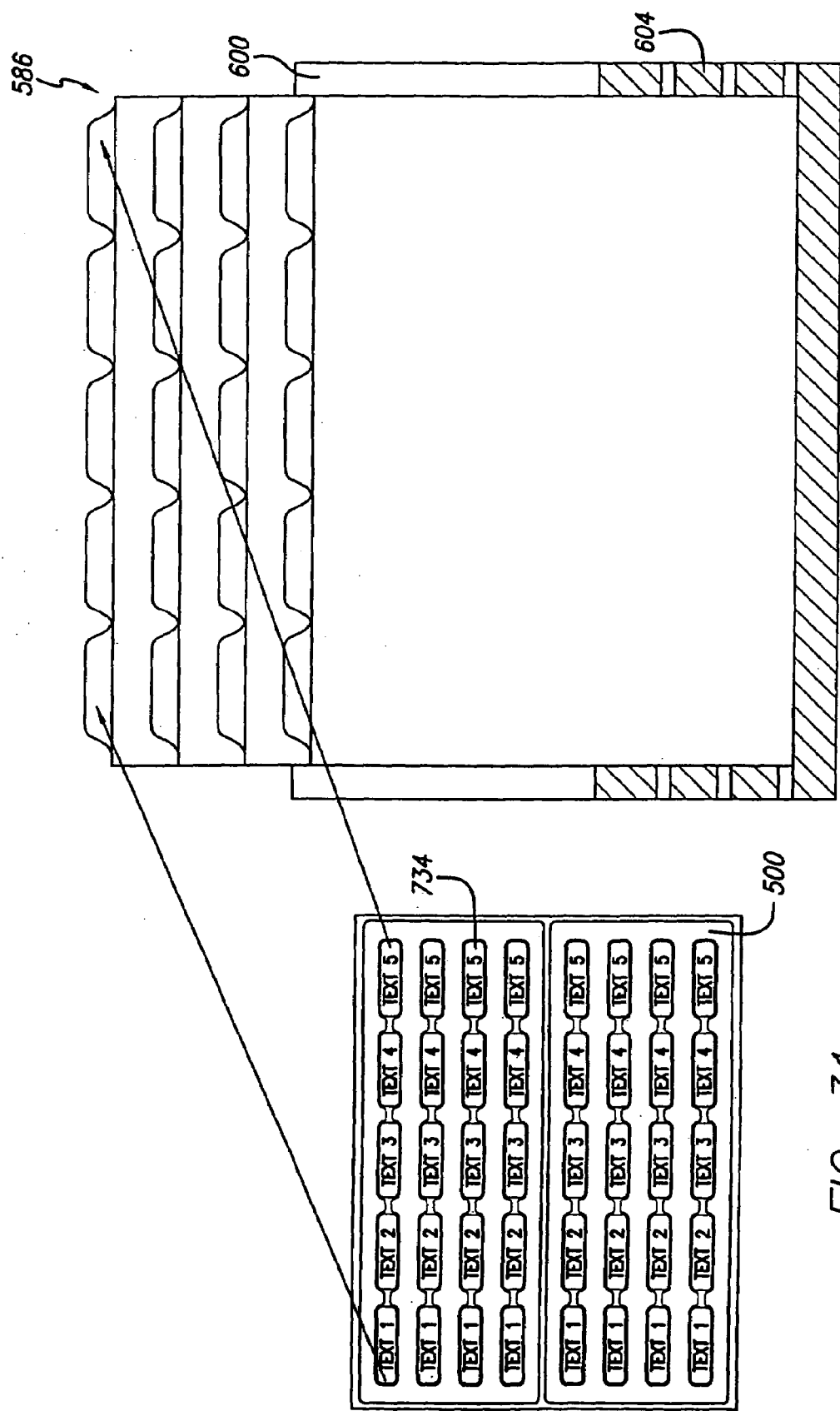
FIG. 31 is a partially cross-sectional view showing an envelope or pouch of the present invention holding a plurality of offset-stacked sets of dividers ready for application of printed labels from a label construction such as that of FIGS. 23 or 28.

An advantage of construction of 500 is that more than one row of labels can be applied at the same time by removing more than one of the liner strips 534. A system for doing this is shown in FIG. 31, where, for example, four rows of printed labels can be applied at the same time to four sets of dividers 586. If the dividers 586 are offset or stacked in a stepped fashion relative to one another, a method for doing this consistently and accurately and holding the sets in this offset position is shown by the pouch 600 of FIG. 31. The pouch 600 has a series of staggered pockets 604, each for holding a respective set of dividers 586.

In other words, FIG. 31 shows a system of placing four rows of labels on tab dividers in a single step. The label sheet construction can be the sheet 500, for example, or constructions as illustrated herein as would be apparent to those skilled in the art. The tab dividers 586 are placed in the unique pouch 600 of the present invention, which positions them in a staggered layout. The pouch 600 can be made from a sheet of paper with several pockets 604 of the same material, glued on the body of the pouch by adhesive. The paper will preferably be ninety pound index or higher basis weight material that can be durable as sensitive dividers are placed in and out of the pouches. This pouch 600 speeds the label application process where numbers of different sets of dividers must be labeled as part of a single operation. This speeds the labeling operation and helps ensure accurate alignment and placement of the labels with minimal user handling.

Examples of materials usable for the label applicator constructions disclosed herein are for the clear film label for laser printers: the facestock can be 1.5 mil polyester with laser topcoating, the adhesive can be permanent acrylic adhesive, and the liner can be 3.4 mil paper release liner. For the clear film label for inkjet printers, the facestock can be 1.5 mil polyester with inkjet top coating, the adhesive can be permanent acrylic adhesive, and the liner can be 3.4 mil paper release liner. Alternatives range from using ink and toner receptive facestock material to using both permanent and removable adhesives. As an example for paper labels, the facestock can be 4.0 mil paper facestock, the adhesive can be acrylic emulsion and the liner can be 2.8 mil paper liner.

Figure 32:
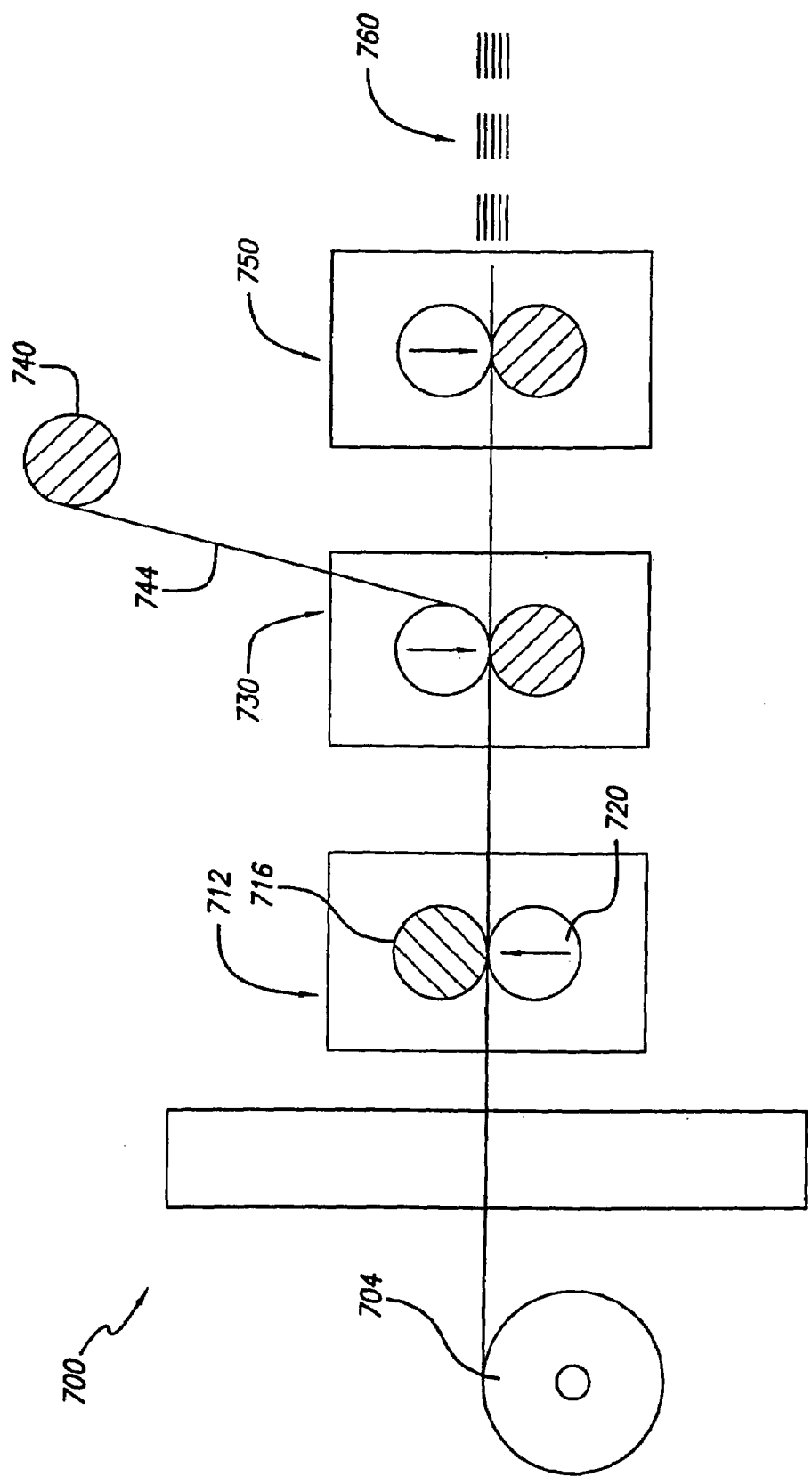
FIG. 32 is a schematic view showing a manufacturing process of a label applicator construction of the present invention.

A manufacturing process of the present invention as shown schematically in FIG. 32 at 700. Referring thereto, the material is a laminate consisting of an ink and/or laser receptive top coated facestock laminated via pressure sensitive adhesive to a release coated paper liner. The facestock can be ink or toner receptive paper or film. The adhesive can be any acrylic emulsion, solvent or hot melt pressure sensitive adhesive that is permanent or removable. And the release liner is a release coated liner. It is supplied in roll form 704 for converting into label sheets. The converting operation may or may not include printing, which generally speaking is not critical to the function or application of the label product.

The material is web fed through the converting press, such as the Mark Andy 4120, so as to pass through an initial rotary die station 712 that, when and where the product requires it, cuts through the liner but not through the polyester facestock. The anvil roller 716 is on top and the cutting die 720 is below at this station, as shown in the drawing. The rotary die that is in the initial die station may or may not include a perforation blade, which makes intermittent cut through the liner along the center of the web.

The web may or may not be turned over before it is passed through a second rotary die station 730 that, where the product requires it, cuts through the polyester facestock but not through the liner. The web then passes through a matrix removal station 740 that lifts and removes a section of the face material 744 which typically includes, but is not limited to, the perimeter around the label sheet and may or may not include a strip removed from the center of the sheet that coincides with the perforation in the liner.

Finally, the web passes through a sheeting station 750, which uses one or more cross-directional blades to cut the web into individual sheets. The sheets are fed into a packaging/collating station 760, which includes a stacker, which stacks the sheets one on top of the other into predetermined count stacks. The individual stacks are either fed into a collator, or fed into a packaging area, where they are packaged in bulk for later collation with other materials.

This general concept of providing a handle or tab (or strip) attached to a label to help the user position and secure the label to the desired surface without touching an adhesive surface can be applied to various different label constructions, as will now be described. In particular, it can be applied to compact disc labels, which are circular and have a circular opening. As described herein, the circular opening can be a full-face type of (narrow) opening corresponding to the diameter of the center opening of the disc or can be a standard diameter such as 1⅝ inch. The circular label itself will have a diameter corresponding to the diameter of the compact disc and may be 4½ inches, as an example. The label assembly can have one or preferably two diametrically opposed tabs extending out from the label and attached thereto. The label assemblies are formed on a sheet having a facestock sheet releasably adhered to a liner sheet. The label assembly is formed by weakened separation lines (die-cut, perforated, scored and other) in the facestock sheet and/or the liner sheet. The various arrangements thereof will be described in detail now with reference to the accompanying drawings.

After the sheet has been passed through a printer or copier and the desired indicia printed on the label portions of the sheet, so that the desired indicia is printed on the label portions of the sheets, the tabs are then pushed or pulled up and grasped with a portion of the liner (liner patch) being adhered to the facestock portion of the tab and the label assembly then peeled off of the sheet. The user can then grasp the other opposing tab, which similarly has a liner sheet portion on its back side (alternatively, he can grasp and pull both tabs at the same time). By grasping the two tabs and the liner sheet portions thereof, the user does not contact any adhesive surface. However, he can position the label directly on the desired surface.

Alternatively, he can position the label assembly on a label applicator device. According to a preferred embodiment, the label assembly is positioned with the adhesive side of the label facing up, the tabs hooked into place, and the CD is then pressed down on a center post of the device into contact with the label for adherence thereto. The CD with the label assembly adhered thereto can be removed from the device and the tabs torn off from the label. Preferably, weakened separation lines provide the tearing lines for the tabs. These are preferably perforated lines passing through the facestock sheet.

Figure 33:
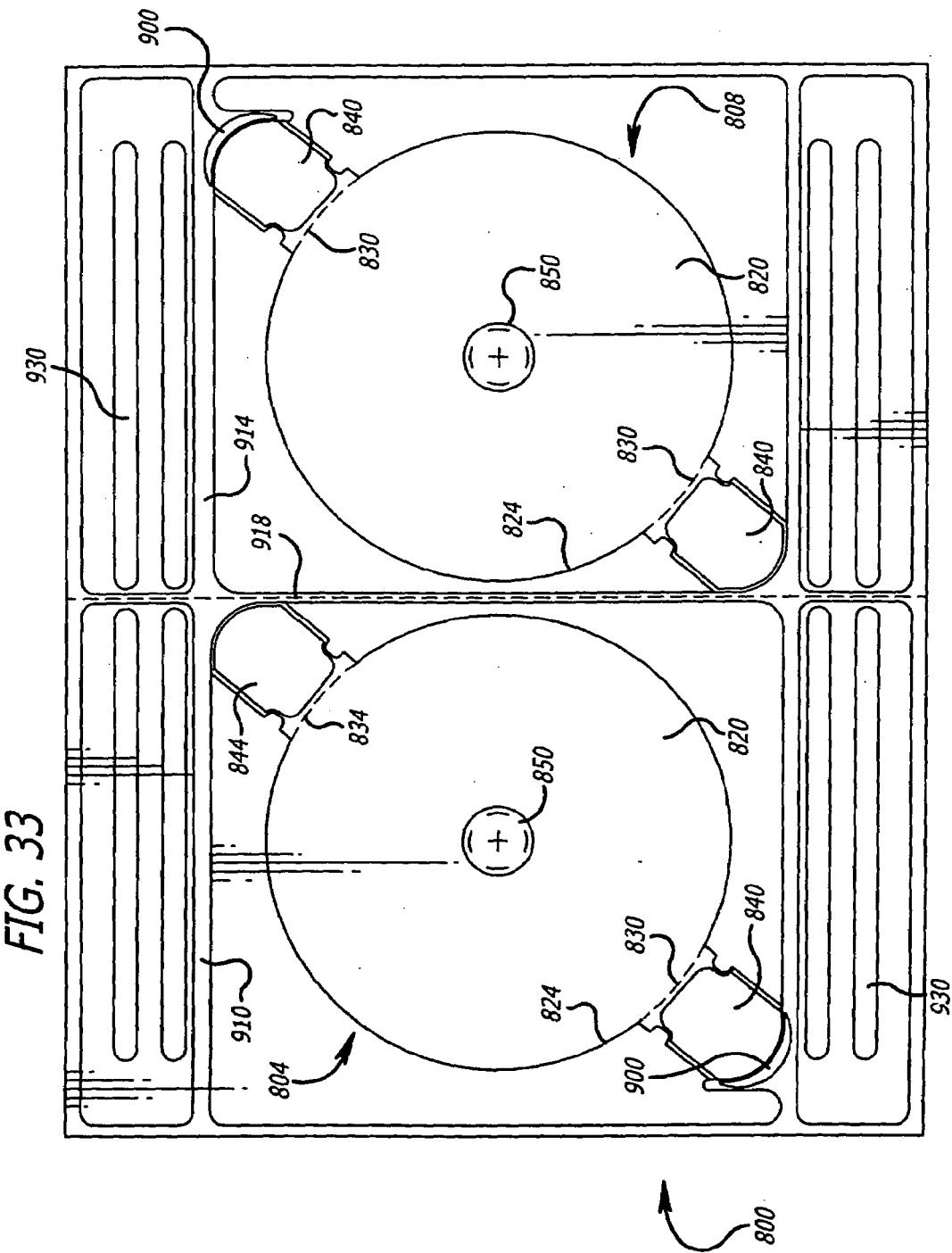
FIG. 33 is a top plan view of a label sheet of the present invention.
Figure 34:
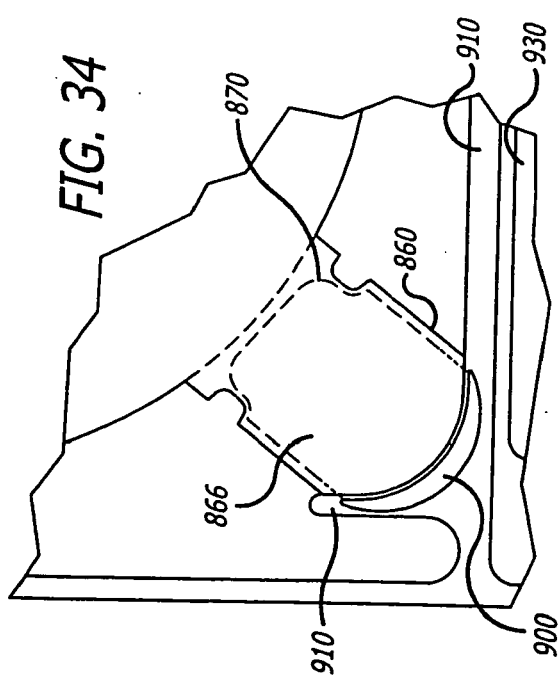
FIG. 34 is an enlarged view of a portion of the sheet of FIG. 33.
Figure 35:
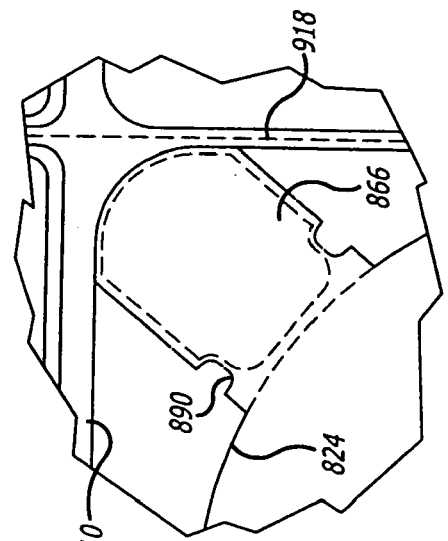
FIG. 35 is an enlarged view of another portion of sheet of FIG. 33.
Figure 36:
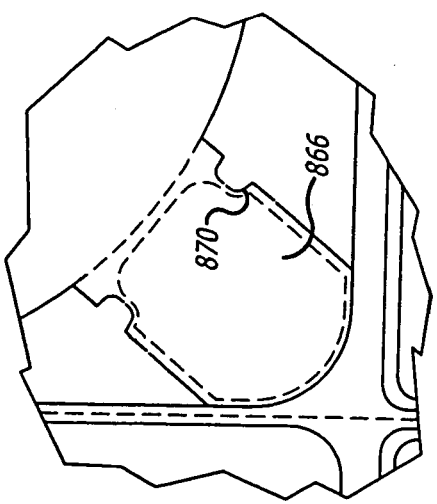
FIG. 36 is an enlarged view of yet another portion of the sheet of FIG. 33.
Figure 37:
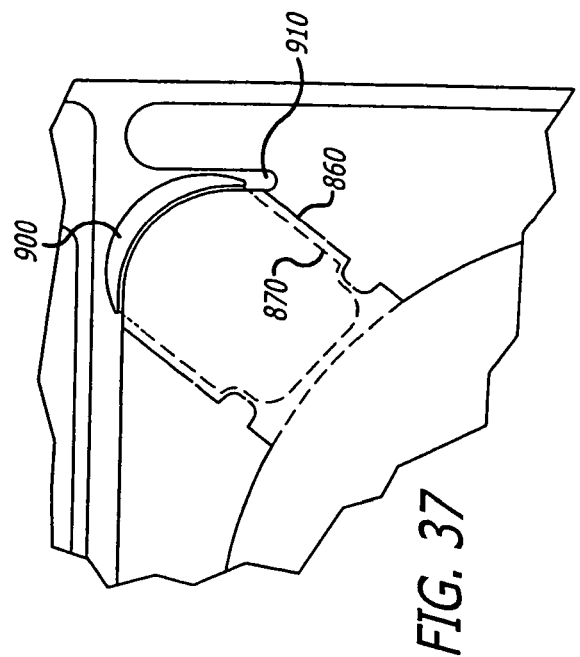
FIG. 37 is an enlarged view of a further another portion of the sheet of FIG. 33.

Referring to FIG. 33, a sheet of the present invention is shown generally at 800. It includes two side-by-side label assemblies 804, 808. The label assemblies are identical except that one is rotated one hundred and eighty degrees relative to the other one. Both include circular labels 820, with the outside circumferences defined by die-cut lines 824 through the facestock sheet around the entire perimeter except for the two portions 830, 834 adjacent the tabs 840, 844. Those arcuate lines 830, 834 are formed by perforated lines extending through both the facestock sheet and the liner sheet. The center hole 850 is formed by a die-cut line, and the hole can either be a full face (small) hole or a standard larger hole. The tab portions of the label assemblies, as is shown in FIGS. 34-37, are formed by die-cut lines having ties and cuts 860 through the facestock sheet. All of the tabs have liner sheet patches 866 formed by cut and/or perforated lines 870 through the liner sheet on their back sides. The liner sheet patches have generally the same size and shape as the facestock portion but with slightly smaller dimensions. Each of the tabs has a pair of opposing side notches 890. These notches are provided to help position and hold the labels in place in label applicator devices, as will be shown and discussed later in this disclosure. The notches can have a central tie portion.

Crescent-shaped areas 900 are preferably formed by die-cut lines through the liner sheet at the ends of one of the two tabs of each of the label assemblies. The label sheet has cut lines through the facestock sheet, forming a matrix 910 of horizontal and vertical lanes 914, 918 outside of the label assemblies. The crescent patches are attached to this matrix. Thus, the facestock matrix can be pulled off of the sheet before the label sheet is marketed to the user. This matrix 910 then will pull off the crescent-shaped portions 900 of the liner sheet attached thereto. This leaves crescent-shaped through-holes through the label sheet (and the facestock sheet). This allows the user to insert the tip of his finger from the top of the label sheet, in through the holes to engage the distal ends of one of the tabs and to pull the tab up, grasp and pull the tab, thereby peeling the label assembly 804 (or 808) off of the sheet 800. In other words, the crescent-shaped holes allow the user to easily engage and pull up on the ends of the tabs 840.

Also, die-cut into the face sheet are a plurality of elongate spine labels 930. Eight are shown in the embodiment of FIG. 33. These labels are also conveniently printed in the printer or copier with the user's custom-designed indicia. They are similarly peeled off and applied to the spines of the jewel cases or other storage boxes for the labeled CDs, by the user.

Figure 38:
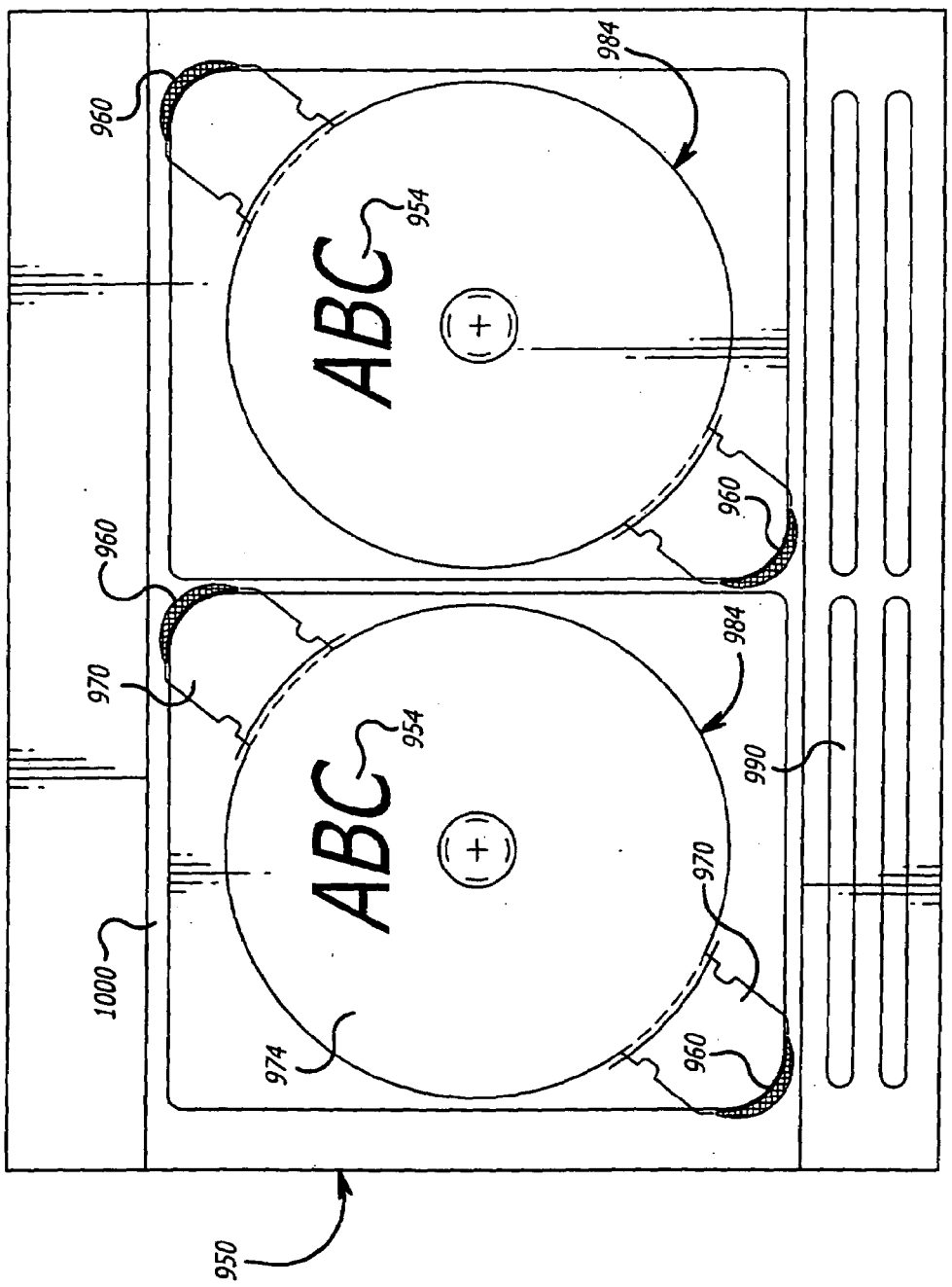
FIG. 38 is a top plan view of an alternative label sheet of the present invention after having passed through a printer or a copier and indicia printed thereon.

FIG. 38 shows generally at 950 a label sheet of the invention which is a variation of the label sheet of FIG. 33. This label sheet 950 is illustrated as provided to the user and after the user has passed it through a printer or copier to have desired indicia 954 printed thereon. It is seen for this embodiment that the crescent-shaped openings 960 are provided for both tabs 970 of each label 974 of each label assembly 980, 984. In contrast, the embodiment of FIG. 33 only provides the crescent-shaped opening for one of the tabs of each of the label assemblies. Another difference is that only four spine labels 990 are provided. A further difference is the configuration of the removable facestock matrix 1000. As discussed above, when this matrix is removed, the crescent-shaped liner sheet portions are removed therewith to form the openings 960. This is an easy way to remove the crescent-shaped sheet portions without having excess small waste pieces produced. That is, it is a much cleaner and more efficient way of removing the crescent-shaped pieces than simply punching them out.

Figure 39:
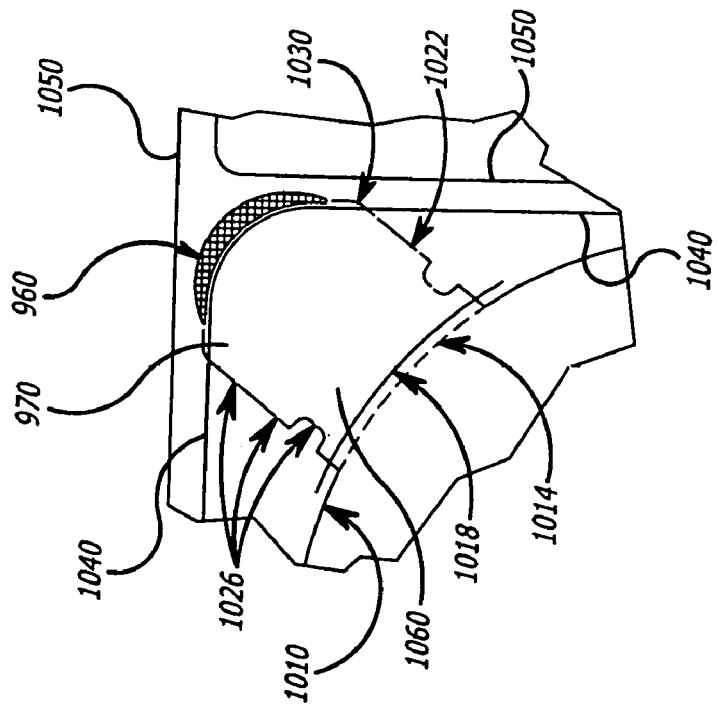
FIG. 39 is an enlarged view of a portion of the sheet of FIG. 38.

FIG. 39 shows an enlarged view of one of the tabs of the sheet of FIG. 38. It shows the face-cut line 1010 only in the circumference of the label, the microperforation arcuate line 1014 through the facestock sheet. The liner-patch die-cut line 1018 is cut through the liner sheet from the liner side. The sides 1022 of the tabs, which are cut to form ties 1026, are cut through the facestock sheet and the liner sheet from the face side. The corners 1030 are cut through the liner from the liner side, and the crescent-shaped hole 960 is cut through the liner. The side edges 1040, 1050 of the face matrix are cut through the facestock sheet. When the face matrix is removed, the crescent-shaped portion of the cut liner, which is adhered thereto with the sheet adhesive, is pulled off and removed with the face matrix 1000 to form the crescent-shaped hole at the end of each of the tabs. For this embodiment, the liner sheet patch 1060 on the rear side of the tabs 970 is the same size as the facestock sheet (front) portion of the tabs.

Figure 40:
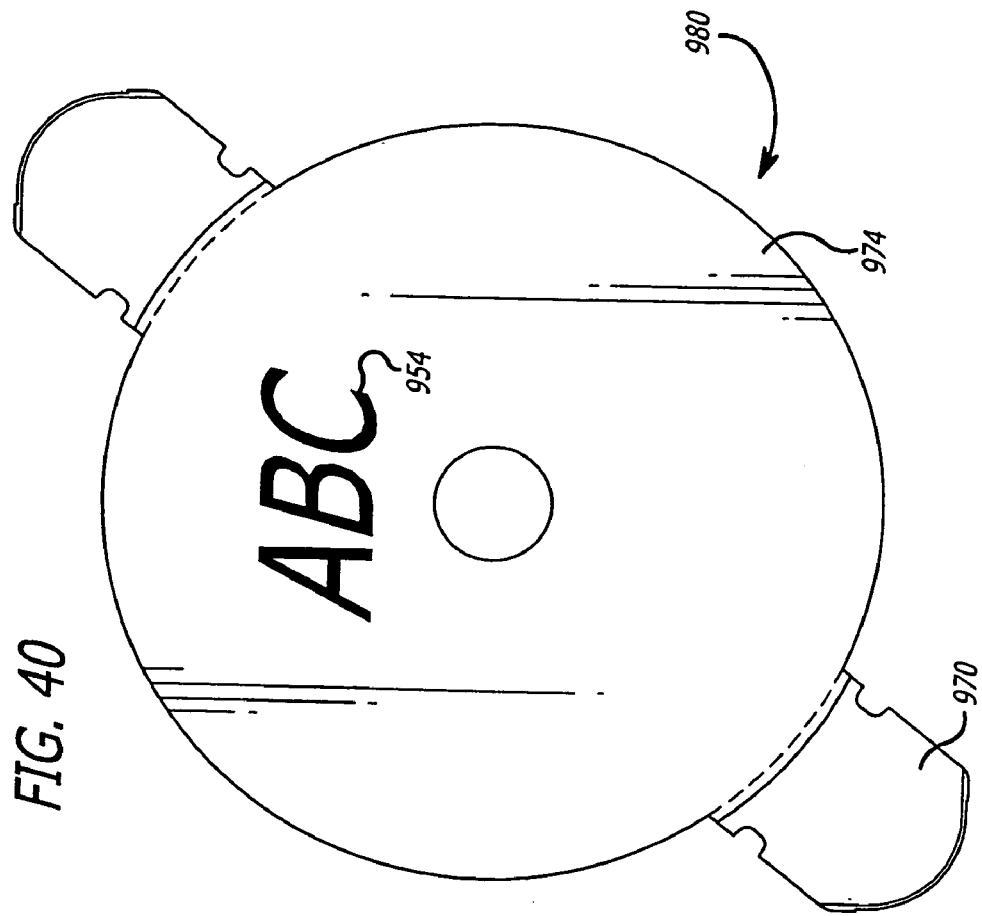
FIG. 40 is a view of one of the label assemblies of sheet of FIG. 38 after having been peeled off of it.

Referring to FIG. 38, after the printing operation as shown thereon, the user inserts his finger into either one of the crescent-shaped openings 960 for one of the label assemblies 980 or 984 and pulls up on the label assembly, grasping the tab 970 from the front and back and peels the label and opposing tab off of the underlying liner sheet, and the user grasps the opposing tab on both sides thereof between the fingers of his other hand. The label assembly 980 is then as depicted in FIG. 40, ready for insertion on a label applicator device.

Figure 41A:
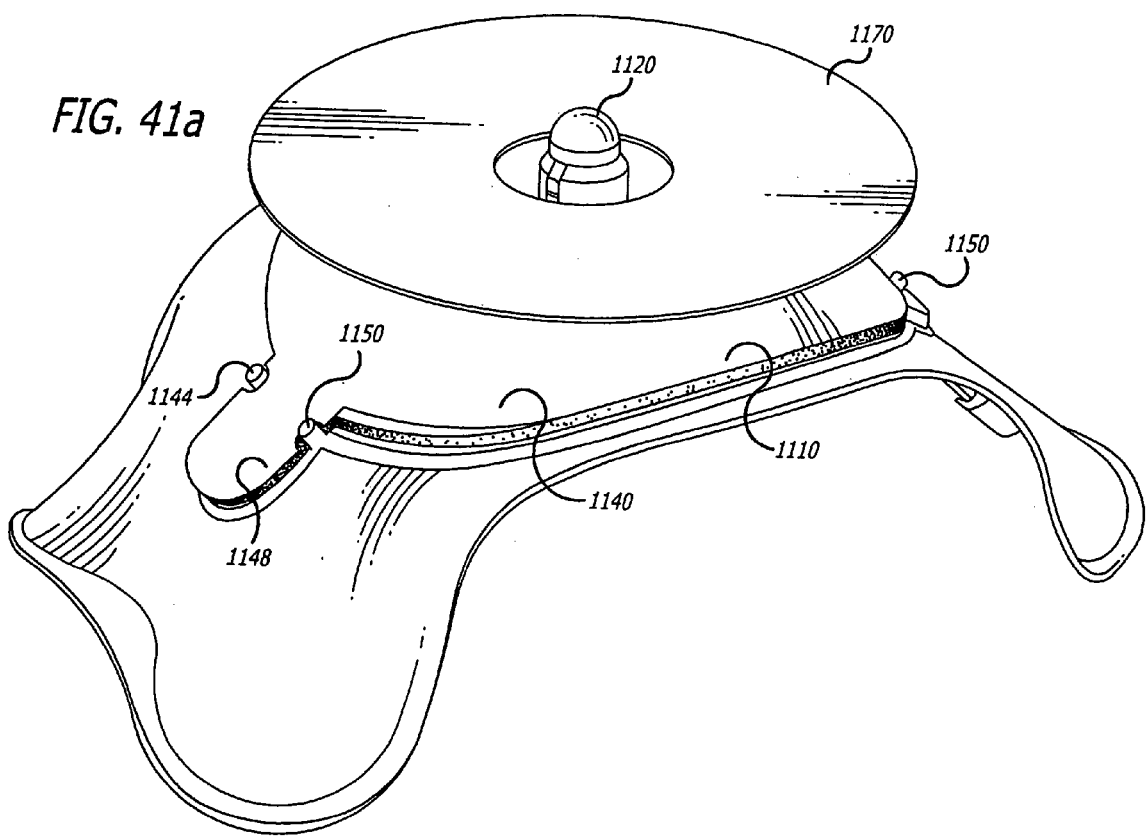
FIG. 41a is a view similar to FIG. 41, showing a CD in a resting position.

FIG. 41 is a perspective view of a label applicator device shown generally at 1100 with a label assembly 1110 of the present invention in position thereon. It can be seen that the label assembly 1110 is fitted via its central hole onto the central post assembly 1120. The label assembly is held on the soft curved support surface 1130 of the device, adhesive side 1140 up, by the positioning of the tab notches 1144 of the tabs 1148 onto the upright device pins 1150. With the label assembly so positioned the CD 1170 is positioned on the center post 1120 as shown in FIG. 41a and pressed down onto the label assembly 1100, effectively adhering the label to the disc. That is, the CD 1170 is shown in FIG. 41 a in a rest position on the post assembly, ready to be manually pressed down onto the adhesive surface of the label assembly 1170.

Figure 42:
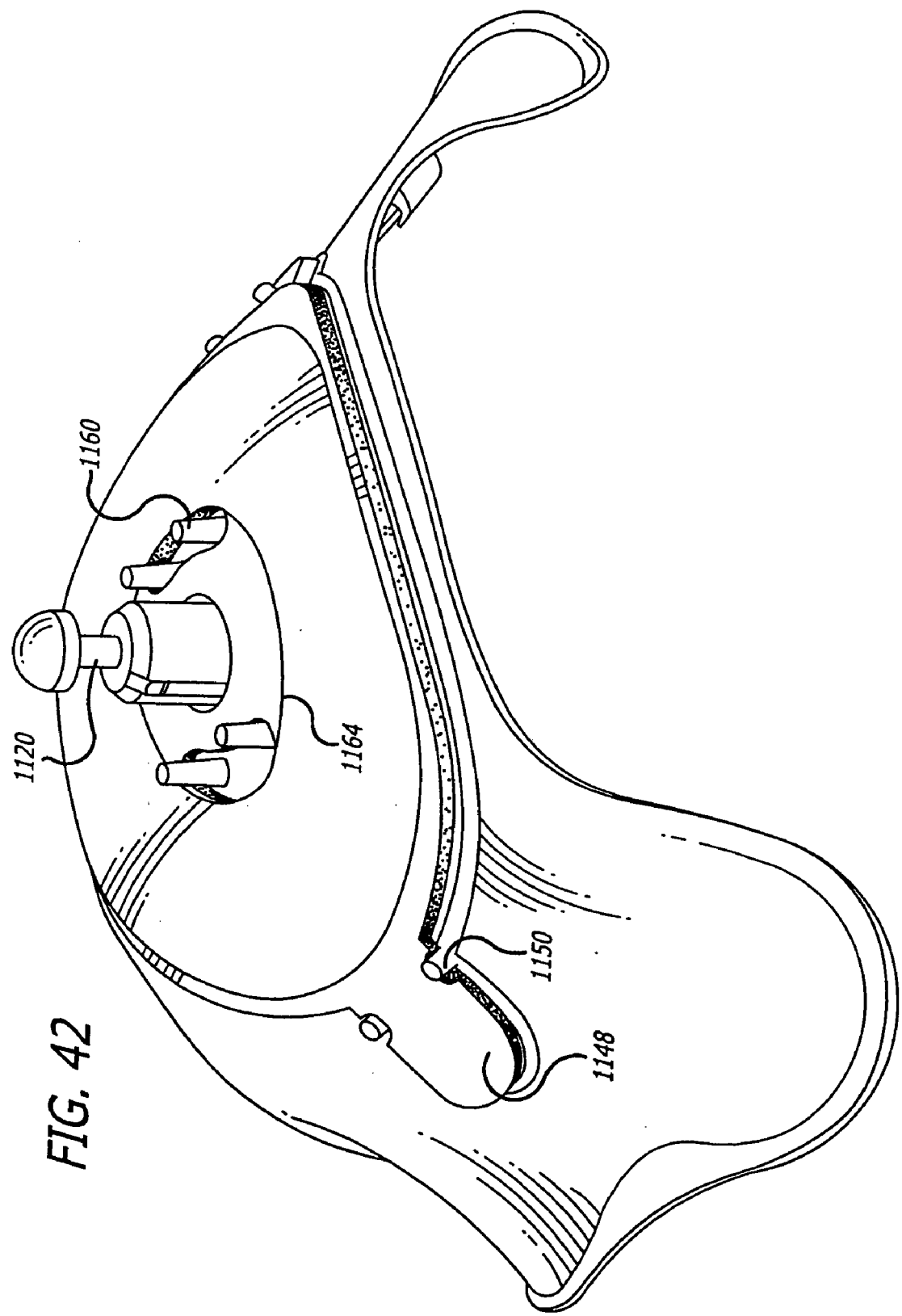
FIG. 42 is a perspective view of a second label assembly of the present invention shown in position on a label applicator device.

FIG. 42 shows the label applicator device 1100 with the post assembly 1120 raised so that the raised pegs of posts 1160 define a large opening 1164 for a large or regular opening label assembly, as depicted. The raised center pegs 1160 position the center opening of the label and the tabs 1148 are held in place by the pins 1150 engaging in the side notches of the tabs.

Figure 43:
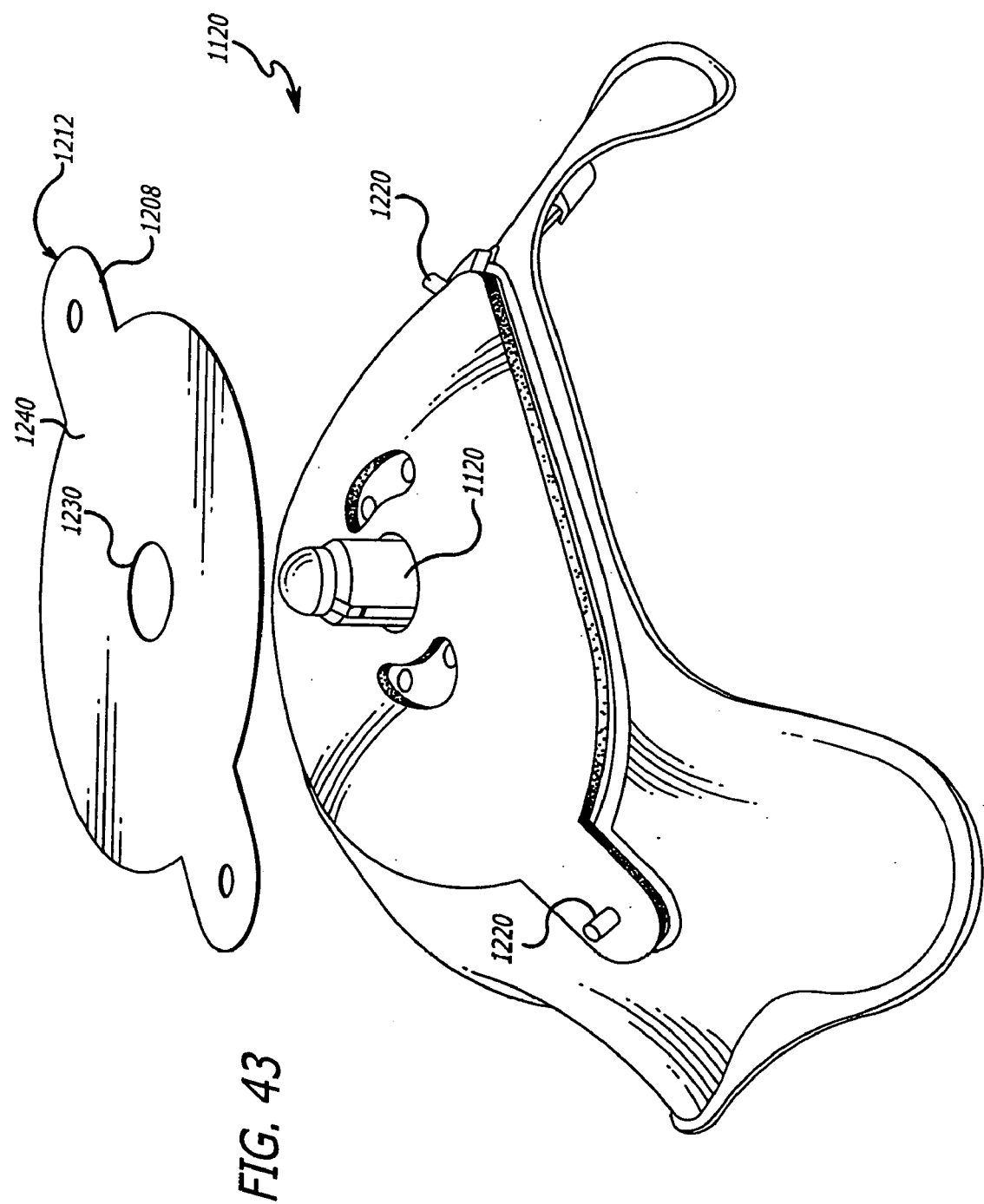
FIG. 43 is a perspective view of a third label assembly of the present invention shown being positioned on a label applicator device.

An alternative applicator device 1200 where, instead of notches in the sides of the tabs, the tabs 1208 have center slots or holes 1212 is shown in FIG. 43. These slots or holes 1212 are then positioned on the posts 1220 of the applicator. While the small hole opening 1230 for the embodiment of the label assembly 1240 is shown, this arrangement can also be used for the regular size opening by raising the post assembly as depicted in FIG. 42.

The notch embodiment is preferred over the central hole embodiment (FIG. 43), which may require that the user punch or push out the center dot piece from the tab 1208 to form hole 1212. Also, because it is easier for the user to see the side pins 1150 instead of a central pin 1220, application of the tabs to the device is easier. The pins in either embodiment can keep the label assembly flat during application, minimizing the possibility of creating bubbles. If bubbles are created, they can be squeezed out without forming wrinkles. Additionally, the tabs can be provided with both side notches and central slots to fit on either device.

FIGS. 44 and 45 show an alternative label applicator device 1260 which has a different shape and slightly different operation, while employing the same function as the above-described devices, in that as the CD is pressed down, the entire applicator device is compressed down against a return bias. The return bias can be provided by the engineered plastic material of the device and/or by leaf or other springs attached to the bottom surface of the device. The longitudinal curving top surface helps position the label assembly and more effectively apply the label to the CD without wrinkling or bubbles. The label assembly 1270 shown in FIGS. 44 and 45 is a regular size opening label 1280. In contrast, the label assembly of FIGS. 46 and 46a is a small hole label 1290.

Figure 47:
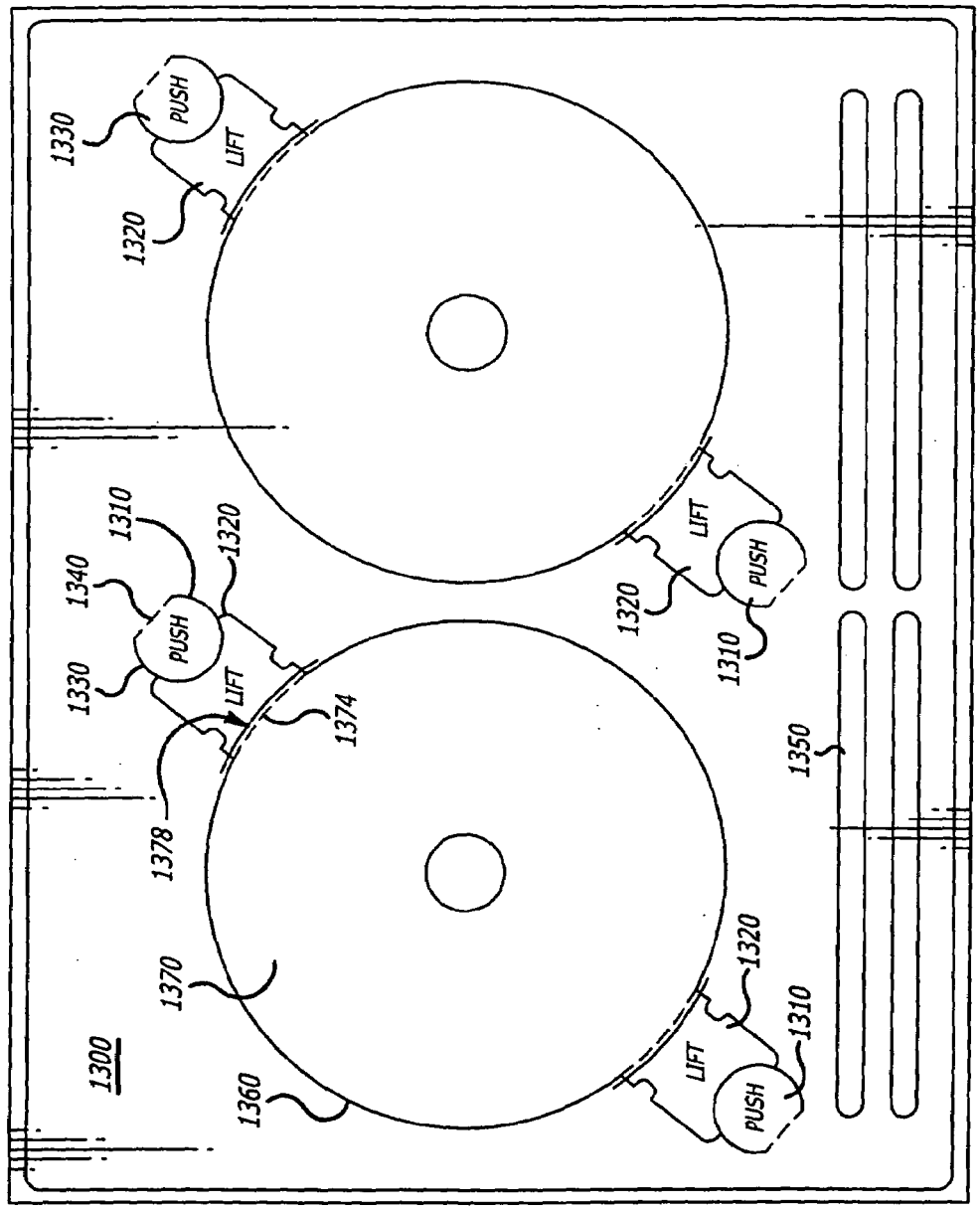
FIG. 47 is a top plan view of an alternative label sheet.

FIG. 47 shows an alternative label sheet 1300 where instead of the crescent-shaped opening, a push tab 1310 is formed at the end of one or both of the tabs 1320 of each of the label assemblies. The tab is cut through both the face and the liner around a substantial portion of the perimeter 1330 and the end 1340 of the push tab is cut with a perforated or similar line through the face and/or liner. Spine labels 1350 can also be provided cut into the facestock sheet. The periphery 1360 of the labels 1370 can be die-cut except at arc 1374. And the liner can be cut at line 1378.

Figure 48:
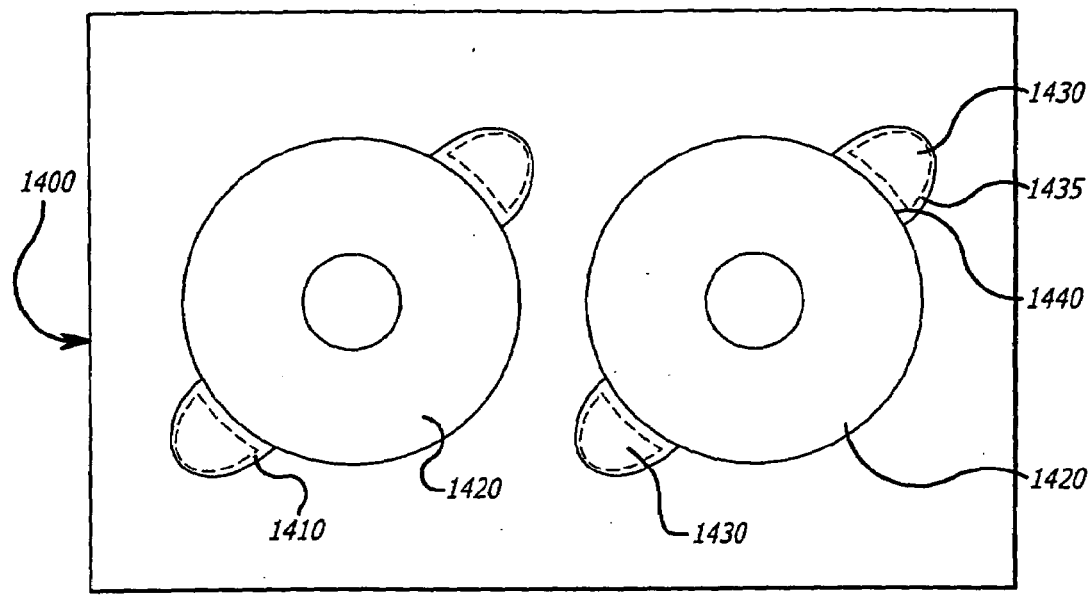
FIG. 48 is a top plan view of an alternative label sheet of the present invention.

FIG. 48 shows an alternative sheet embodiment 1400 where the CD label assembly is located symmetrically on the sheet. Tabs 1410 on either side of the label 1420 are formed. The liner section 1420 of the tab is directly underneath the facestock portion 1430 of the tab so that by pushing the liner section, the facestock section partially separates from the sheet. The facestock section 1430 is attached to the compact disc label 1420 by perforations 1440. Lifting the facestock portion of the tab with the attached liner section of the tab lifts the compact disc label 1420 from the liner sheet. The opposed tab with its liner section can be lifted prior to the removal of the compact disc label 1420 or it can be left in and will pull the section of the opposite tab up during removal.

Figure 49:
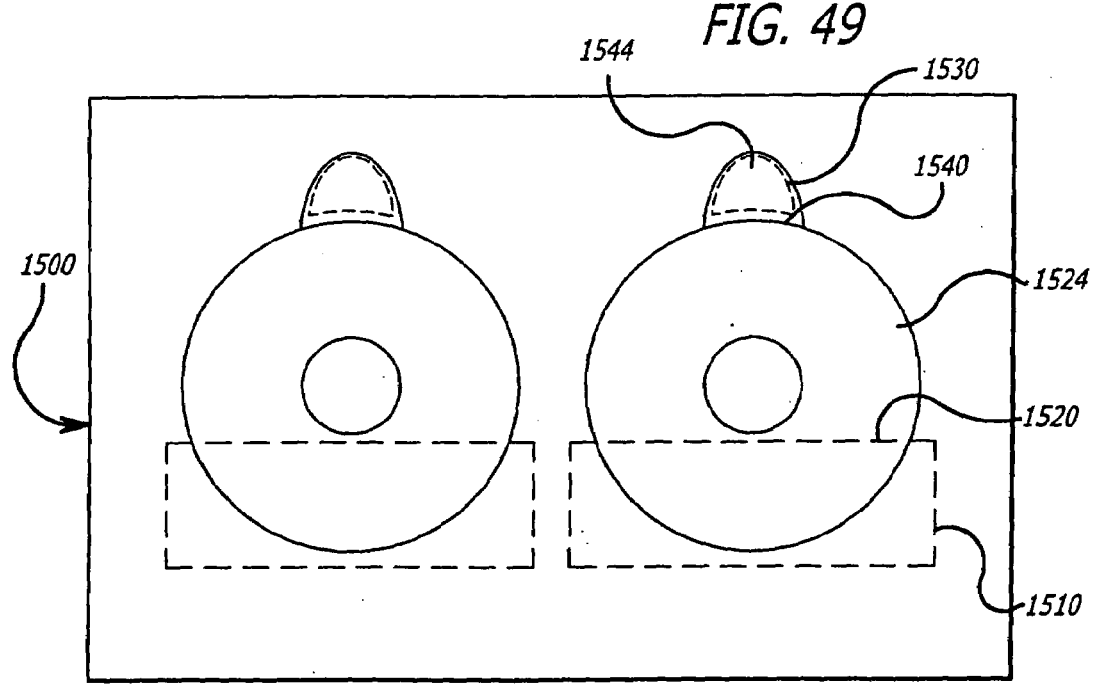
FIG. 49 is a top plan view of another label sheet of the present invention.

Referring to FIG. 49, an alternative label sheet embodiment is shown generally at 1500 wherein the alignment tab 1510 which is a perforation cut through both the facestock and the release liner and is separated by a liner cut 1520, is removed along with the (compact disc) label 1524. The tab 1530 is attached to the compact disc label 1524 by a perforation line 1540, and the tab liner section 1544. This label assembly can be handled without contacting the adhesive-coated surface. The alignment tab 1510 can then be used to align the label with the compact disc using the contours of the compact disc jewel case in accordance with U.S. Pat. No. 5,715,934, incorporated herein.

This concept incorporates a mirror image of the "hat" concept that is currently used for Laser, Inkjet, and Color Laser CD labels. One purpose of having the second "hat" is to allow users to punch out the "hats" from behind and remove the CD label. A portion of the label (the middle area) has exposed adhesive, while the remainder of the assembly is still in laminate form. The idea is to place this assembly upside down on a CD applicator and peel back both "hats" simultaneously, so that equal force is applied in opposite directions as the liner sections of the "hats" are removed from the CD label. This allows the CD label to be relatively undisturbed on the applicator while the liner is being removed, with the end goal of having the CD label adhesive side up, with all of the adhesive exposed, never having contacted the adhesive directly with either hand. The CD can then be placed on top of the CD label in the applicator and applied thereto.

An alternate use of this concept would be to use the jewel case as an alignment tool and utilize it as our existing CD labels are used. The first "hat" would be positioned into the appropriate corners of the jewel case, the exposed area of the label would be applied to the CD, and then the "hats" would be removed sequentially or simultaneously. Again, the user would not need to contact an adhesive coated surface during this label application process.

Figure 50:
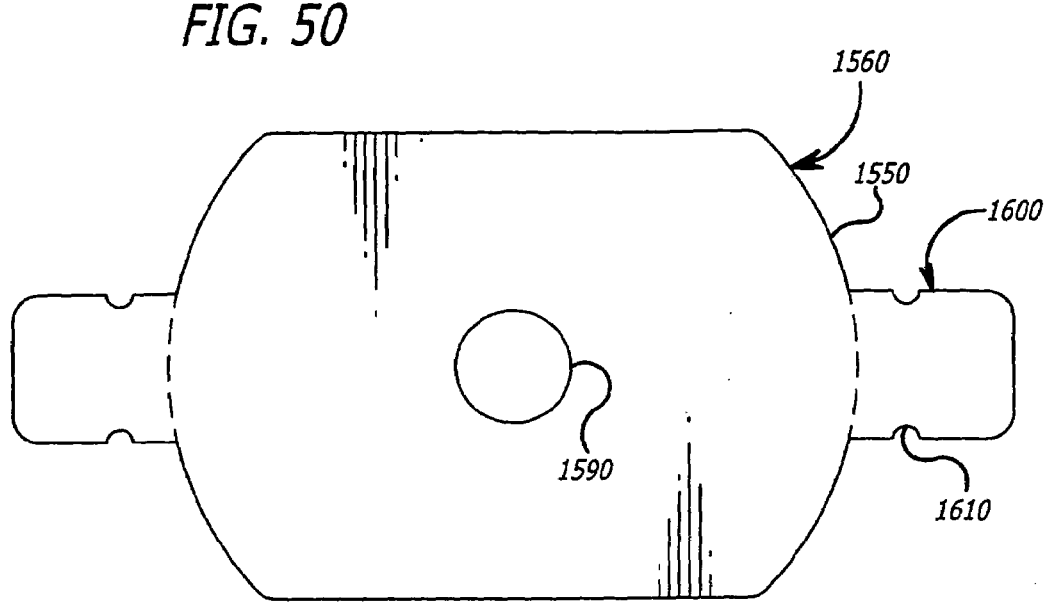
FIG. 50 is a top plan view of a label assembly for a business card compact disc of the present invention.
Figure 51:
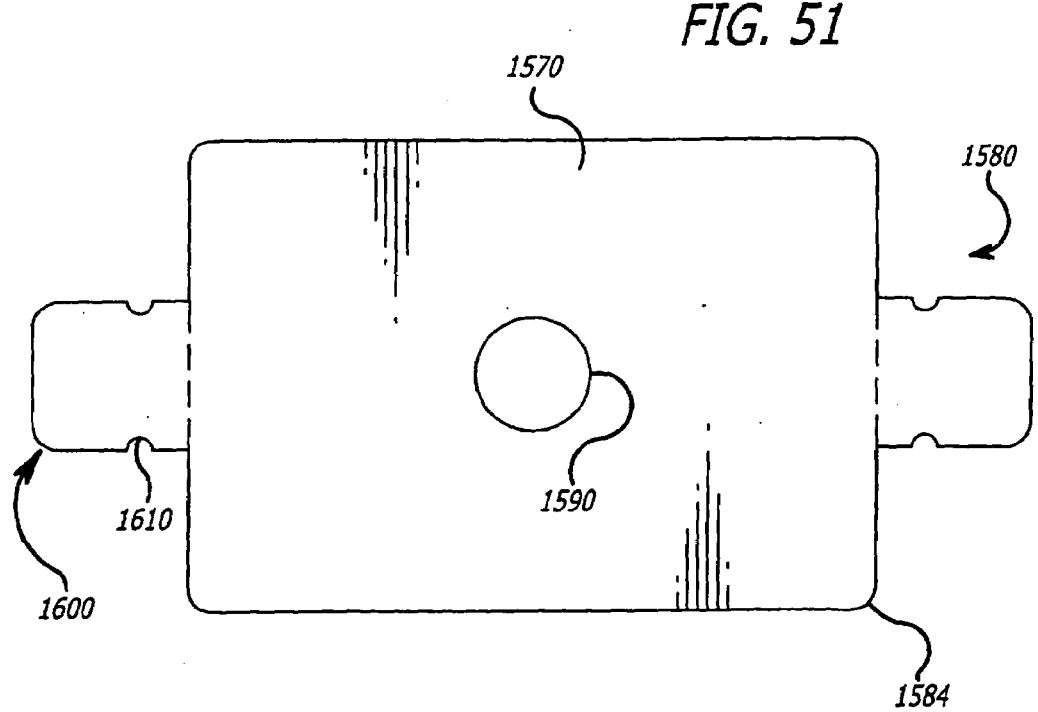
FIG. 51 is a top plan view of another label assembly for business card compact disc.

FIGS. 50 and 51 show label assemblies used for business card CD's. The label portion 1550 of the label assembly 1560 of FIG. 50 has rounded ends while the label 1570 of the assembly 1580 of FIG. 51 has square corners 1584, and both have center holes 1590. These different configurations are provided to accommodate and fit on different configurations of business card CD's. It is noted that both of the label assemblies of FIGS. 50 and 51 have the no-touch tabs 1600 with notches 1610 and with the liner sheet portion or patch on the back side of the tabs so the user advantageously does not grasp an adhesive surface. These tabs have notches to fit onto centering pegs of label applicator devices, as previously described, or adapted to accommodate CD business cards. Alternatively, they can have central slots or holes. A further embodiment would be to omit any notches or holes These labels can be shaped to match a variety of business card CD types, as would be apparent to those skilled in the art.

Figure 52:
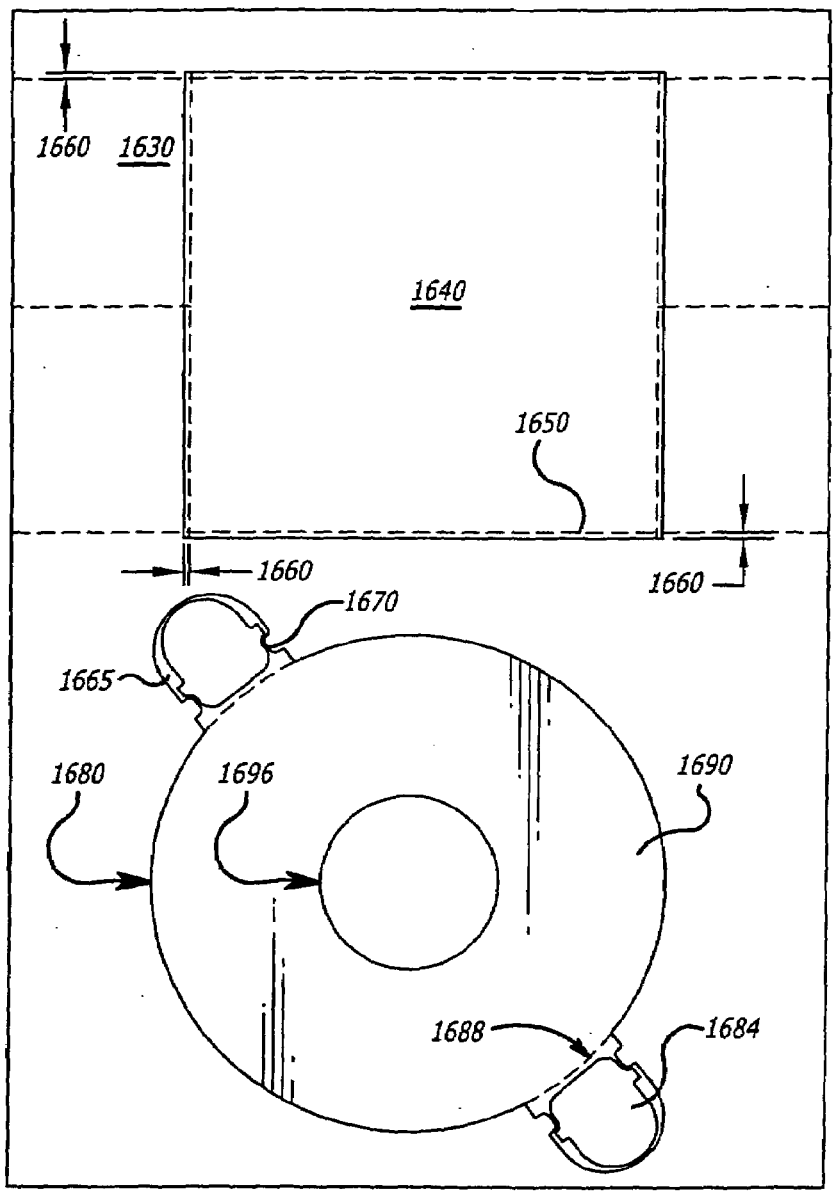
FIG. 52 is a top plan view of a label assembly sheet which includes a jewel case insert.
Figure 53:
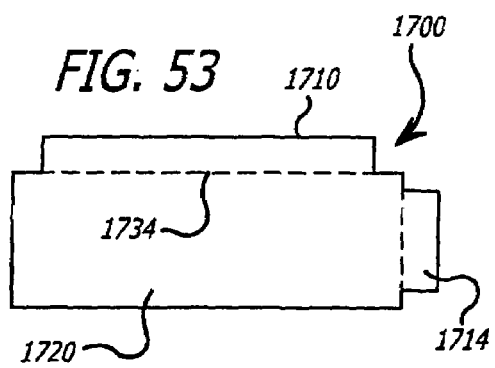
FIG. 53 illustrates another embodiment of the invention.

The label sheet 1630 of FIG. 52 is used to provide printed or non-printed jewel case inserts together with the CD label assemblies. The jewel case insert shown at the top of the sheet at 1640 is a 4.875 by 4.875 inch square. It is defined by microperforations 1650 through both the face sheet and the liner sheet, with 0.0625 inch offsets 1660. The face and backing are both permanent laminations so that they feel like a regular card. In other words, the area 1640 does not have a silicone coating, while the rest of the sheet does have a silicone coating. The tabs 1670 of the single label assembly 1680 both have the cut liner portions 1684 secured to their rear surfaces as previously discussed so that the user does not contact adhesive surface while handling the tabs. Microperfs 1688 in the face sheet separate the tabs from the labels 1690. The center holes 1696 in the labels can be either full face or regular size openings. One or more spine strips can also be provided on the sheet 1630.

Figure 54:
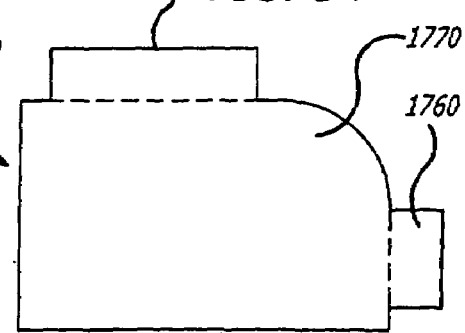
FIG. 54 illustrates a further embodiment of the invention.

FIG. 54 shows generally at 1700 an address label embodiment after removal from a label sheet. The top and side tabs 1710, 1714 with liner sheet patches on their back sides are used to align the label 1720 correctly to an envelope (not shown) and then are torn off along their perforation lines 1734. This leaves the adhesive printed or non-printed label correctly positioned and adhered to the envelope.

A license plate label assembly 1750 having a pair of no-touch tabs 1760, 1764 extending out from the label 1770 is shown in FIG. 54. These tabs 1760, 1764 are aligned to the edge of the license plate, the label 1770 applied and the tabs removed in a process similar to that described with respect to other embodiments herein.

From the foregoing detailed description, it will be evident that there are a number of changes, adaptations and modifications of the present invention which come within the province of those skilled in the art. For example, the labels, instead of being passed through a printer or copier, are written directly thereon by a pencil, pen or the like, or the labels are provided on the sheet with the indicia pre-printed. Or the labels can be unprinted color coded labels. Another alternative is for the labels when on the sheet to not have adhesive thereon but rather to be detached or removed and then attached to an adhesive surface. While one preferred embodiment uses a clear glossy polyester (or film) facestock, an adhesive layer and a paper liner, other materials can be used. However, it is intended that all such variations not departing from the spirit of the invention be considered as within the scope thereof.

We claim:

1. A label application method, comprising:

removing a label assembly from a label sheet construction to form a removed label assembly;

the label sheet construction including (1) a liner sheet, (2) adhesive, (3) a facestock sheet label releasably adhered with the adhesive to the liner sheet, and (4) a facestock sheet tab extending out from the label and releasably adhered to the liner sheet with the adhesive;

the tab having a notch;

the removed label assembly including the label and the tab connected to the label and extending out therefrom;

positioning the removed label assembly on a label applicator device such that a positioning structure of the device engages the notch to position the label on a label support surface of the device and the label assembly is thereby in a label application position; and with the label assembly in the label application position, applying the label assembly to an article using the device.

2. The method of claim 1 further comprising before the removing, sheet feeding the label sheet construction into a printer or copier and indicia thereby being printed on the label.

3. The method of claim 1 wherein the label assembly includes a liner sheet patch adhered with the adhesive to a back side of the tab.

4. The method of claim 3 wherein the removing includes grasping the tab and the patch.

5. The method of claim 1 wherein the article is an optical disc.

6. The method of claim 1 wherein the applying includes pushing the article against the label.

7. The method of claim 1 further comprising after the applying, removing the tab from the label.

8. The method of claim 1 wherein the removing includes grasping the tab and peeling the label assembly off of the liner sheet.

9. The method of claim 1 wherein the notch defines a first notch, the positioning structure defines a first positioning structure, the tab has a second notch, and the label application position includes a second positioning structure of the device engaging the second notch.

10. The method of claim 9 wherein the first notch is on a side edge of the tab and the second notch is on an opposite side edge of the tab.

11. The method of claim 1 wherein the tab defines a first tab, the label sheet construction includes a facestock sheet second tab extending out from the label and releasably adhered to the liner sheet with the adhesive, and the removed label assembly includes the second tab connected to the label and extending out therefrom.

12. The method of claim 1 wherein the label sheet construction includes a through-hole adjacent to the tab, and the removing includes inserting a finger tip in the through-hole and pulling up on the tab.

13. The method of claim 12 wherein the tab includes a liner sheet patch adhered to a back side of the tab.

14. The method of claim 12 wherein the through-hole has a crescent shape and is positioned adjacent an outer end of the tab.

15. The method of claim 1 wherein the label sheet construction includes a facestock sheet releasably adhered with the adhesive to the liner sheet, the facestock sheet having weakened lines defining the label and the tab.

16. The method of claim 1 wherein the liner sheet forms the entire bottom surface of the label sheet construction.

17. The method of claim 1 wherein the label sheet construction includes a weakened line at least substantially within a perimeter of the label to define a facestock sheet portion, and the removing includes separating the label from the facestock sheet portion with the facestock sheet portion remaining attached to the liner sheet.

18. The method of claim 17 wherein the separating forms a hole in the label, and the label application position includes a part of the device positioned in the hole.

19. The method of claim 1 further comprising after the applying, tearing along a weakened line between the tab and the label.

20. The method of claim 1 wherein the label application position includes an exposed adhesive face of the label being upwardly disposed.

21. The method of claim 1 wherein the positioning structure includes a pin.

22. A label application method, comprising:
positioning a label assembly on a label applicator device;
the label assembly including a label, a first tab extending radially out from the label, and a second tab extending radially out from the label;
the label having a hole and an adhesive face;
the device having a post, a support surface and restraining structure;
the positioning including positioning the label assembly such that the post is in the hole and the label is on the support surface; and
with the label assembly on the device, applying an article to the adhesive face with the tabs engaging the restraining structure to thereby restrain movement of the hole relative to the post to keep the label centered relative to the post.

23. The method of claim 22 further comprising before the positioning, sheet feeding the label assembly as part of a label sheet construction into a printer or copier and indicia thereby being printed on the label.

24. The method of claim 22 wherein the label assembly includes a liner sheet patch adhered with adhesive to a back side of the first tab.

25. The method of claim 24 wherein the positioning includes grasping the first tab and the patch and grasping the second tab.

26. The method of claim 22 wherein the article is an optical disc.

27. The method of claim 22 further comprising after the applying, removing the first and second tabs from the label.

28. The method of claim 22 before the positioning, removing the label assembly from a label sheet construction which includes a through-hole adjacent to the first tab, and the removing includes inserting a finger tip in the through-hole and pulling up on the first tab.

29. The method of claim 28 wherein the first tab includes a liner sheet patch adhered to a back side of the first tab.

30. The method of claim 28 wherein the through-hole has a crescent shape and is positioned adjacent an outer end of the first tab.

31. The method of claim 22 further comprising after the applying, tearing along a weakened line between the first tab and the label.

32. The method of claim 22 wherein the positioning includes positioning the label assembly such that an exposed adhesive face of the label is upwardly disposed, and the restraining structure engages in a hole or notch of the first tab.

33. A label application method, comprising:
removing a label assembly from a label sheet construction to form a removed label assembly;
the removed label assembly including a label and opposing tabs extending radially out from the label and positioned on a tab axis which passes through the label;
the label having an adhesive face;
positioning the label assembly in a label application position, with the adhesive face exposed and upwardly disposed, on a label applicator device;
the positioning including engaging the tabs to the device so as to restrain movement of the label along the tab axis;
with the label assembly in the label application position, applying the adhesive face to an article; and
after the applying, removing the tabs from the label.

34. The method of claim 33 further comprising before the removing the label assembly, sheet feeding the label sheet construction into a printer or copier and indicia thereby being printed on the label.

35. The method of claim 33 wherein the label assembly includes a liner sheet patch adhered with adhesive to a back side of one of the tabs.

36. The method of claim 35 wherein the removing the label assembly includes grasping the patch.

37. The method of claim 33 wherein the article is an optical disc.

38. The method of claim 33 wherein the removing the label assembly includes grasping the tab and peeling the label assembly oft of a liner sheet of the label sheet construction.

39. The method of claim 33 wherein the label sheet construction includes a through-hole adjacent to one of the tabs, and the removing the label assembly includes inserting a finger tip in the through-hole and pulling up on the one of the tabs.

40. The method of claim 39 wherein the one of the tabs includes a liner sheet patch adhered to a back side of the one of the tabs.

41. The method of claim 39 wherein the through-hole has a crescent shape and is positioned adjacent an outer end of the one of the tabs.

42. The method of claim 33 wherein the label sheet construction includes a facestock sheet releasably adhered with adhesive to a liner sheet, and the facestock sheet has weakened lines defining the label and the tabs.

43. The method of claim 33 wherein a liner sheet of the label sheet construction forms the entire bottom surface of the label sheet construction.

44. The method of claim 33 wherein the label sheet construction includes a weakened line at least substantially within a perimeter of the label to define a facestock sheet portion, and the removing the label assembly includes separating the label from the facestock sheet portion with the facestock sheet portion remaining attached to a liner sheet of the label sheet construction.

45. The method of claim 44 wherein the separating forms a hole in the label, and the positioning includes positioning a post of the device in the hole.

46. A label application method, comprising:
positioning a label assembly in an application position on a label applicator device;
the label assembly including a label, a first tab extending radially out from the label and a second tab extending radially out from the label;
the application position including a post of the device positioned in a hole of the label, the label positioned on a support surface of the device, the first tab engaging a first pin of the device and the second tab engaging a second pin of the device;
with the label assembly in the application position, applying the label to an article; and
during the applying, the pins engaging the respective tabs and thereby restraining movement of the label in a plane thereof and relative to the post.

47. The method of claim 46 further comprising before the positioning, sheet feeding a label sheet construction which includes the label assembly into a printer or copier and indicia thereby being printed on the label.

48. The method of claim 46 wherein the label assembly includes a liner sheet patch adhered with adhesive to a back side of the first tab.

49. The method of claim 46 wherein the article is an optical disc.

50. The method of claim 46 wherein the applying includes pushing the article against the label.

51. The method of claim 46 further comprising after the applying, removing the tabs from the label.

52. The method of claim 46 wherein before the positioning, a label sheet construction includes the label assembly and a through-hole adjacent to the first tab, and further comprising inserting a finger tip in the through-hole and pulling up on the first tab to remove the label assembly from the label sheet construction.

53. The method of claim 52 wherein the first tab includes a liner sheet patch adhered to a back side of the first tab.

54. The method of claim 52 wherein the through-hole has a crescent shape and is positioned adjacent an outer end of the first tab.

55. A label application method, comprising:
positioning a label assembly in an application position on a label applicator device;
the label assembly including a label and a tab extending out from the label;
the label having a hole and an adhesive face;
the device including a label support surface, a post and restraining means for restraining movement of the label relative to the post by engaging at least the tab;
the positioning including placing the tab in an engagement position relative to the restraining means;
the positioning including placing the label on the support surface with the post in the hole; and
after the positioning, applying the label to an article with the restraining means restraining movement of the label via at least the tab and thereby keeping the label centered relative to the post.

56. The method of claim 55 further comprising before the positioning, sheet feeding a label sheet construction which includes the label assembly into a printer or copier and indicia thereby being printed on the label.

57. The method of claim 55 wherein the label assembly includes a liner sheet patch adhered with adhesive to a back side of the tab.

58. The method of claim 55 wherein the article is an optical disc.

59. The method of claim 55 wherein the applying includes pushing the article against the label.

60. The method of claim 55 further comprising after the applying, removing the tab from the label.

61. The method of claim 55 wherein before the positioning, the label assembly is part of a label sheet construction which includes a through-hole adjacent to the tab, and further comprising inserting a finger tip in the through-hole and pulling up on the tab to remove the label assembly.

62. The method of claim 61 wherein the tab includes a liner sheet patch adhered to a back side of the tab.

63. The method of claim 61 wherein the through-hole has a crescent shape and is positioned adjacent an outer end of the tab.

64. The method of claim 55 further comprising after the applying, tearing along a weakened line between the tab and the label.

65. The method of claim 55 wherein the restraining means includes a pin of the device.

66. A label application method, comprising:
providing a label assembly including a label having a label hole and a tab extending out from the label;
the tab having a tab hole or notch;

positioning the label assembly in a label application position on a label applicator device wherein a post of the device is disposed in the label hole, the label is disposed on a support surface of the device and the tab hole or notch is in an engagement position with respect to a pin of the device;

with the label assembly in the label application position, applying the label to an article; and after the applying, removing the tab from the label.

67. The method of claim 66 wherein the providing includes removing the label assembly from a label sheet construction.

68. The method of claim 67 further comprising before the removing the label assembly, sheet feeding the label sheet construction into a printer or copier and indicia thereby being printed on the label.

69. The method of claim 67 wherein the label assembly includes a liner sheet patch adhered with adhesive to a back side of the tab.

70. The method of claim 69 wherein the removing the label assembly includes grasping the tab and the patch.

71. The method of claim 67 wherein the label sheet construction includes a through-hole adjacent to the tab, and the removing the label assembly includes inserting a finger tip in the through-hole and pulling up on the tab.

72. The method of claim 71 wherein the tab includes a liner sheet patch adhered to a back side of the tab.

73. The method of claim 71 wherein the through-hole has a crescent shape and is positioned adjacent an outer end of the tab.

74. The method of claim 67 wherein the label sheet construction includes a weakened line at least substantially within a perimeter of the label to define a facestock sheet portion, and the removing includes separating the label from the facestock sheet portion with the facestock sheet portion remaining attached to a liner sheet of the label sheet construction.

75. The method of claim 66 wherein the article is an optical disc.

76. The method of claim 66 wherein the tab hole or notch defines a first notch, the pin defines a first pin, the tab has a second notch, and the label application position includes a second pin of the device engaging the second notch.

77. The method of claim 76 wherein the first notch is on a side edge of the tab and the second notch is on an opposite side edge of the tab.

78. The method of claim 66 wherein the removing the tab includes tearing along a weakened line between the tab and the label.

79. A label application method, comprising:
providing a label assembly including a facestock sheet label having a label hole and a facestock tab extending out from the label and having a tab notch;

positioning the label assembly in a label application position on a label applicator device wherein a post of the device is disposed in the label hole, the label is disposed on a support surface of the device and the tab notch is in an engagement position with respect to a pin of the device; and with the label assembly in the label application position, applying the label with the tab extending out from the label to an article.

80. The method of claim 79 wherein the label assembly includes a liner sheet patch adhered with adhesive to a back side of the tab.

81. The method of claim 79 wherein the article is an optical disc.

82. The method of claim 79 wherein the applying includes pushing the article against the label.

83. The method of claim 79 further comprising after the applying, removing the tab from the label.

84. The method of claim 79 wherein the tab notch defines a first notch, the pin defines a first pin, the tab has a second notch, the label application position includes a second pin of the device engaging the second notch, the first notch is on a side edge of the tab and the second notch is on an opposite side edge of the tab.

85. The method of claim 84 wherein the facestock tab defines a first tab, the label assembly includes a second tab extending out from the label and having a third notch on a side edge of the second tab and a fourth notch on an opposite side edge of the second tab, and the label application position includes a third pin of the device engaging the third notch and a fourth pin of the device engaging the fourth notch.

86. The method of claim 79 wherein the tab defines a first tab, and the label assembly includes a second tab connected to the label and extending out therefrom.

87. The method of claim 79 wherein the providing includes the label assembly being part of a label sheet construction which includes a through-hole adjacent to the tab, and inserting a finger tip in the through-hole and pulling up on the tab to remove the label assembly from the label sheet construction.

88. The method of claim 87 wherein the tab includes a liner sheet patch adhered to a back side of the tab.

89. The method of claim 87 wherein the through-hole has a crescent shape and is positioned adjacent an outer end of the tab.

* * * * *